US007724950B2

(12) United States Patent
Umeda

(10) Patent No.: US 7,724,950 B2
(45) Date of Patent: May 25, 2010

(54) IMAGE PROCESSING APPARATUS, IMAGE PROCESSING METHOD, COMPUTER PROGRAM, AND STORAGE MEDIUM

(75) Inventor: Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 11/423,898

(22) Filed: Jun. 13, 2006

(65) Prior Publication Data

US 2006/0280361 A1    Dec. 14, 2006

(30) Foreign Application Priority Data

Jun. 14, 2005    (JP)    ............... 2005-174252

(51) Int. Cl.
 *G06K 9/00* (2006.01)
(52) U.S. Cl. ...................... 382/167; 382/117
(58) Field of Classification Search ............... 382/117, 382/162, 164, 165, 167, 190, 195, 199, 209, 382/219, 274, 308, 321; 345/591; 396/158; 351/205, 206

See application file for complete search history.

(56) References Cited

U.S. PATENT DOCUMENTS

| | | | |
|---|---|---|---|
| 4,641,349 A * | 2/1987 | Flom et al. ............... | 382/117 |
| 6,151,403 A | 11/2000 | Luo | |
| 6,252,976 B1 | 6/2001 | Schildkraut | |
| 6,278,491 B1 | 8/2001 | Wang | |
| 6,292,574 B1 | 9/2001 | Schildkraut | |
| 6,798,903 B2 * | 9/2004 | Takaoka ............... | 382/167 |
| 7,116,820 B2 | 10/2006 | Luo | |

FOREIGN PATENT DOCUMENTS

| | | |
|---|---|---|
| JP | 07-013274 A | 1/1995 |
| JP | 11-136498 A | 5/1999 |
| JP | 11-149559 A | 6/1999 |
| JP | 11-284874 A | 10/1999 |
| JP | 2000-125320 A | 4/2000 |
| JP | 2004-326805 A | 11/2004 |

* cited by examiner

*Primary Examiner*—Jose L Couso
(74) *Attorney, Agent, or Firm*—Canon U.S.A. Inc., I.P. Division

(57) ABSTRACT

An image processing apparatus configured to detect an image region indicating a poor color tone of eyes from candidate regions includes: a first determination unit configured to perform a determination relating to an evaluation amount with respect to the poor color tone based on a predetermined color component in a target candidate region, and the evaluation amount in a peripheral region of the candidate region, a second determination unit configured to update the candidate region based on the first determination result, and to perform a determination relating to the evaluation amount or a predetermined color component with reference to pixels in an updated second candidate region, and a third determination unit configured to update the second candidate region based on the second determination result, and to perform a determination relating to a characteristic amount of a peripheral region with reference to pixels in a peripheral region of an updated third candidate region. A calculation amount of the third determination is greater than a calculation amount of the first or second determination.

44 Claims, 28 Drawing Sheets

FIG.5A FIG.5B
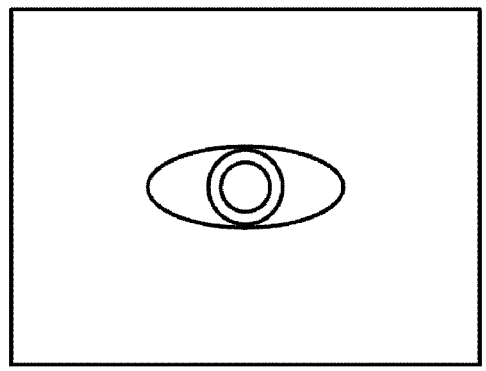
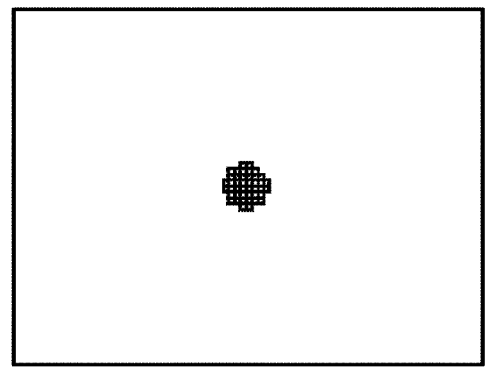
FIG.6A
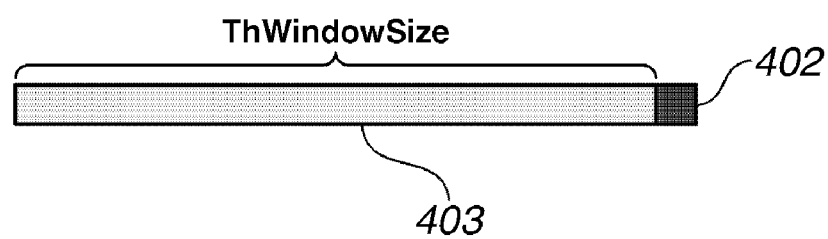
FIG.6B
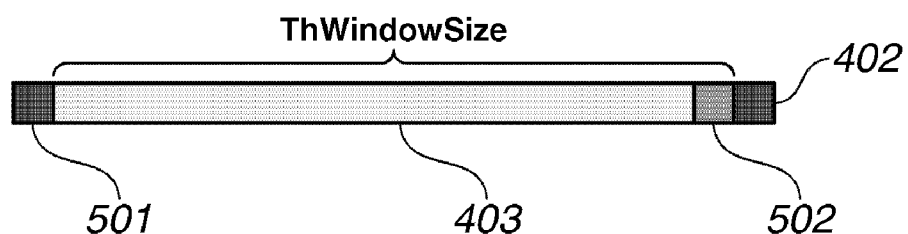

| DIRECTION | 1 | 2 | 3 | 4 | 5 | 6 | 7 | 8 |
|---|---|---|---|---|---|---|---|---|
| FREQUENCY | 1 | 1 | 2 | 1 | 0 | 2 | 1 | 1 |

FIG.13A FIG.13B FIG.13C
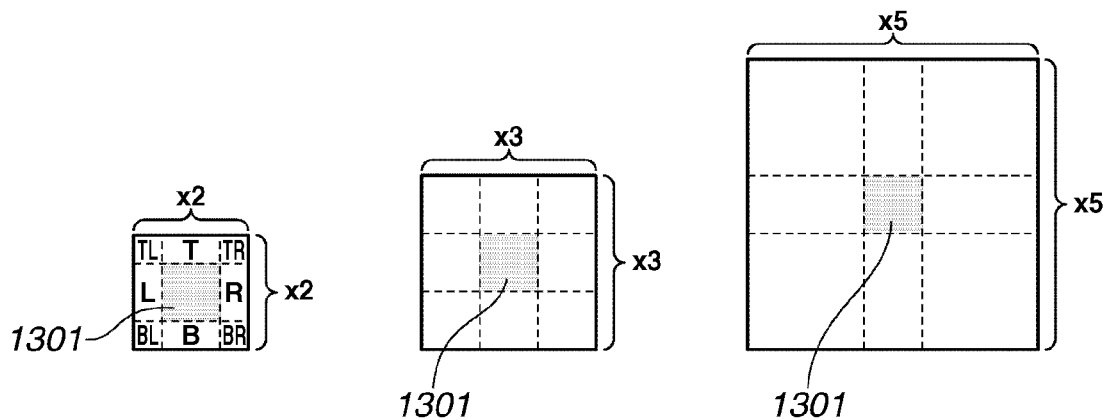
FIG.14A FIG.14B
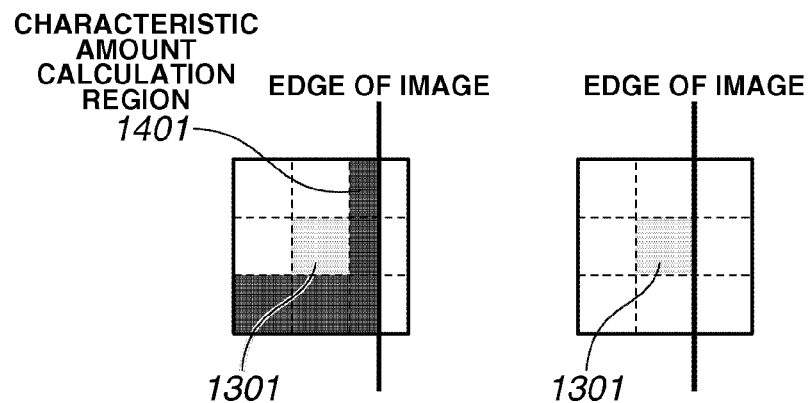

FIG.26
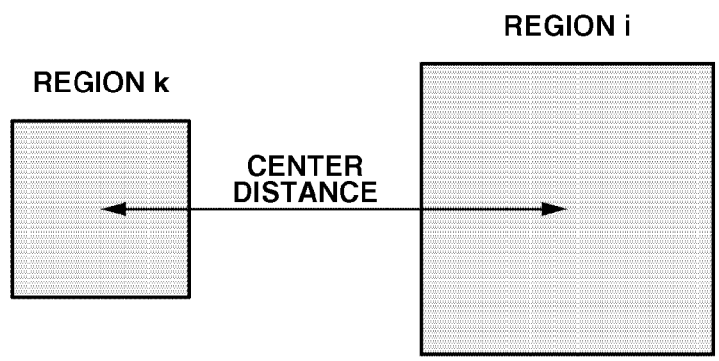
FIG.27
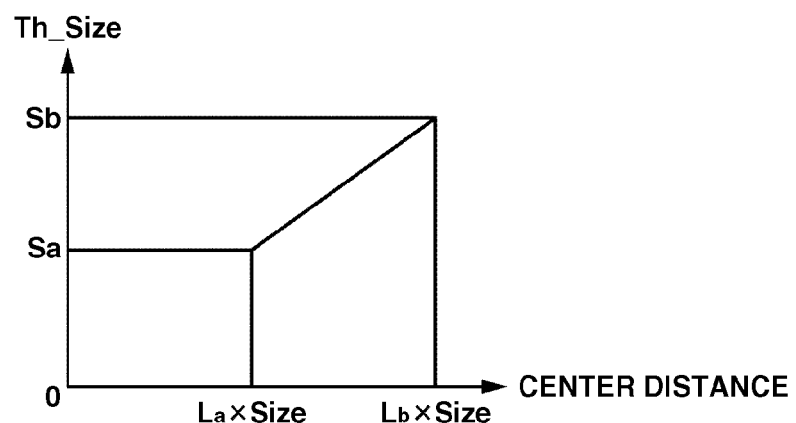
FIG.28A      FIG.28B
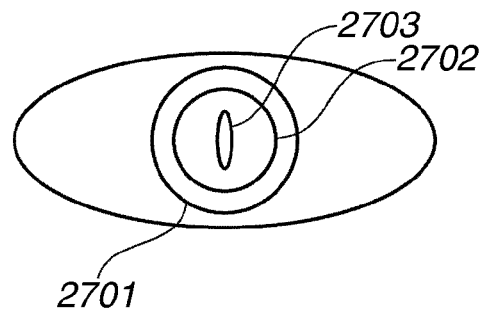 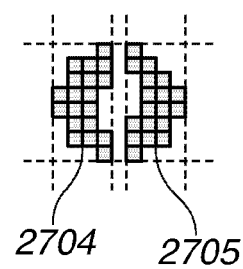

FIG.31
| INDEX | UPPER LEFT COORDINATES | | LOWER RIGHT COORDINATES | |
|---|---|---|---|---|
| | x | y | x | y |
| 0 | 50 | 30 | 55 | 35 |
| 1 | 100 | 30 | 105 | 35 |
| 2 | 80 | 205 | 90 | 210 |
| 3 | 130 | 205 | 140 | 210 |
FIG.32A
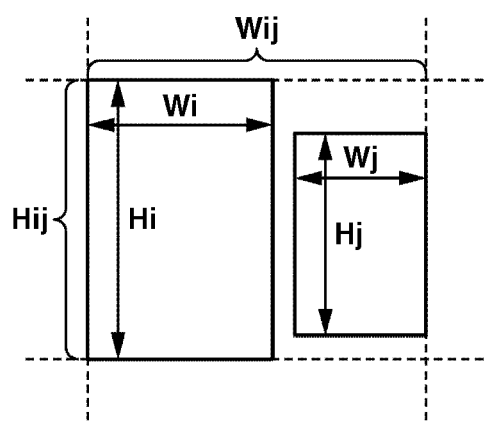
FIG.32B
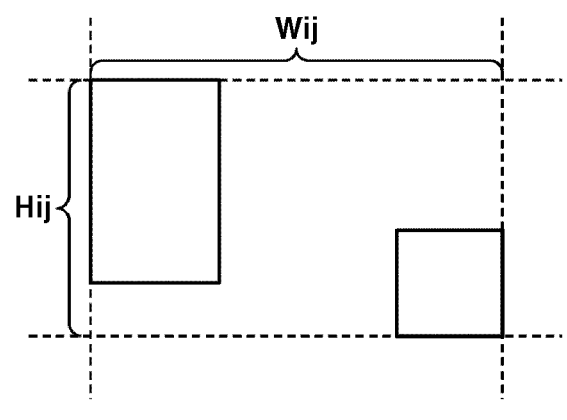

UPPER END OF (N+1)-TH BAND
RED CIRCLE REGION
UPLen
OverlapArea
BTLen
LOWER END OF N-TH BAND

| INDEX | UPPER LEFT COORDINATES | | LOWER RIGHT COORDINATES | | MAXIMUM BRIGHTNESS VALUE Ymax | MAXIMUM EVALUATION VALUE Ermax |
|---|---|---|---|---|---|---|
| | x | y | x | y | | |
| 0 | 50 | 30 | 55 | 35 | 228 | 96 |
| 1 | 100 | 30 | 105 | 35 | 208 | 89 |
| 2 | 80 | 205 | 90 | 210 | 198 | 92 |
| 3 | 130 | 205 | 140 | 210 | 212 | 87 |

IMAGE PROCESSING APPARATUS, IMAGE PROCESSING METHOD, COMPUTER PROGRAM, AND STORAGE MEDIUM

CROSS REFERENCE TO RELATED APPLICATIONS

This application is related to co-pending application Ser. No. 11/423,903 filed on Jun. 13, 2006.

BACKGROUND OF THE INVENTION

1. Field of the Invention

The present invention relates to image processing apparatuses and image processing methods, and more particularly to an image processing technique for detecting an image region indicating a poor color tone of eyes.

2. Description of the Related Art

Various methods for correcting a poor color tone of eyes, which may be caused by the flash from a camera, have been proposed. In general, a poor color tone of eyes is well known as a red-eye phenomenon (or red-eye effect). The environment having an insufficient illumination may cause a red-eye phenomenon, if a human or an animal such as a dog or a cat is photographed with flash.

More specifically, the flash light enters the eye through an opened pupil and reflects off the back of the eye. At this moment, red light can be returned from the capillary on the eyeground. The red-eye phenomenon often occurs if a photographed person has bright pigments because of higher transmissivity of a pupil, i.e., a crystalline lens.

Many digital cameras have compact bodies. In such a compact body, the optical axis of a lens is positioned closely to a flash light source. When a light source position of the flash is adjacent to the optical axis of the lens, the red-eye phenomenon occurs easily.

One of the methods for reducing the red-eye phenomenon is a pre-light emission prior to photographing, so that pupils of a photographed person can be closed beforehand. However, according to this method, a large capacity of battery will be required and a photographed person may change the face by the pre-light emission.

To correct or reduce red eyes, personal computers or comparable apparatuses can process and reconstruct an image from digital data obtained by a digital camera. In general, the methods for correcting red eyes based on digital image data can be roughly classified into three types of correction: i.e., manual correction; semiautomatic correction; and automatic correction.

The manual correction requires a user's manipulating a pointing device, such as a mouse, a stylus, or a tablet, or a similar touch panel to designate a red eye region (i.e., a region to be corrected) which is displayed on a display unit.

The semiautomatic correction requires a user's rough designation about a region where a red eye is present and a computer's operation for specifying a correction range of a red eye based on the information given by the user and performing necessary corrections. For example, the user can designate a region surrounding an eye, or a point near an eye, with a pointing device. The computer specifies a correction range and executes corrections based on information on the designated region or designated point.

The automatic correction requires no special operation by a user because a computer executes fully automated operations including automatically detecting a correction region from digital image data and executing correction processing.

According to the manual or semiautomatic correction, a user has to manually designate a portion to be corrected. For example, it will be troublesome for auser if required to display an enlarged image including a region to be corrected and to designate a correction region on image data. If a large screen of a display equipped in a personal computer system is available, such a designating operation may be relatively easy. However, in the case of ordinary digital cameras or printers, which have a small display unit of several inches, unless a user enlarges an image and scrolls to the appropriate portion of the enlarged image, the user cannot find and designate a correction region.

There are conventional methods for automatically correcting the red-eye phenomenon, requiring no complicated operations and effectively applicable to a compact device equipped with a small display unit.

For example, Japanese Patent Application Laid-open No. 11-136498 discusses a method including the steps of detecting a skin color region from an image, searching and detecting pixels constituting a red eye within the detected region, and correcting the pixels constituting the red eye.

Furthermore, Japanese Patent Application Laid-open No. 11-149559 discusses a method including the steps of detecting a skin color region, detecting recessed regions having lower brightness corresponding to a pupil, and determining an eye based on a distance between two recessed regions in the detected region.

Furthermore, Japanese Patent Application Laid-open 2000-125320 discusses a method including the steps of detecting a skin color region, determining whether the detected skin color region has characteristics of a human face, detecting a set of red-eye defects in the detected region, evaluating a distance and size of the red-eye defects, and specifying a red eye region.

Furthermore, Japanese Patent Application Laid-open 11-284874 discusses a method including the steps of automatically determining whether an image includes a red pupil, detecting a position and size of the red pupil, and automatically converting red pixels within the pupil into a predetermined color of pixels.

However, the conventional automatic red-eye correction methods have the following problems.

The human skin color detection or the face detection relying on a neural network requires searching a wide range of image data to obtain a reliable result from the detection of a red eye region. In other words, a large amount of memory is required and a huge amount of calculations will be necessary. Such processing may not be so difficult for a personal computer equipped with a high performance CPU operable with a clock of several GHz and a memory of several hundreds MB. However, digital cameras and printers may not be able to process such a great amount of image data.

Furthermore, besides the above-described automatic corrections, there are many conventional methods relying on the difference in saturation to discriminate a red eye region from a peripheral region. However, the saturation-based determination cannot be preferably applied to a person having dark pigments. As is well known, when pixel values are defined in the RGB system, a saturation S can be expressed by the following formula (1).

$$S = \{\max(R, G, B) - \min(R, G, B)\}/\max(R, G, B) \quad (1)$$

where, max (R, G, B) represents a maximum value among R, G and B components, and min (R, G, B) represents a minimum value among R, G and B components.

According to experimental results, the skin color region of a typical Japanese person has a unique distribution concentrated from 0 to 30 degrees in the hue (0-359 degrees) According to the hue expression in the HIS (hue-intensity-saturation) system, a region near 0 degree is red and the color gradually changes to yellow when the hue increases. The R, G and B values in the range of 0 to 30 degrees have the following relationship.

$$R>G>B \qquad (2)$$

As described above, compared with a person having bright pigments, a person having dark pigments seldom has brighter red eyes. As an example, a typical Japanese person will have the following pixel values in a red eye region and a skin color region around the eye.

Red eye region: (R, G, B)=(109, 58, 65)
Skin color region: (R, G, B)=(226, 183, 128)

In this case, the saturation of a red eye region pixel is 40, while the saturation of a skin color region pixel is 43. There is no substantial difference between two saturation values.

In other words, the method relying on the saturation may not be able to determine a red eye pixel if a photographed object (person) has dark pigments.

SUMMARY OF THE INVENTION

The present invention is directed to accurately detecting an image region indicating a poor color tone of eyes.

According to an aspect of the present invention, an image processing apparatus configured to detect an image region indicating a poor color tone of eyes includes: a calculation unit, a pixel extraction unit, a region extraction unit, a first determination unit, an updating unit, a second determination unit, and a detection unit. The calculation unit is configured to calculate an evaluation amount with respect to the poor color tone for each pixel of an input image based on a predetermined color component. The pixel extraction unit is configured to extract candidate pixels constituting an image region indicating the poor color tone based on the evaluation amount. The region extraction unit is configured to extract a candidate region of a predetermined shape that includes the candidate pixels. The first determination unit is configured to perform a determination relating to a characteristic amount of a peripheral region of the candidate region. The updating unit is configured to update the candidate region based on a determination result obtained by the first determination unit. The second determination unit is configured to perform a determination relating to an edge intensity of a peripheral region of the updated candidate region. The detection unit is configured to detect the image region indicating the poor color tone based on a determination result obtained by the second determination unit.

According to another aspect of the present invention, an image processing apparatus configured to detect an image region indicating a poor color tone of eyes includes: a calculation unit, a pixel extraction unit, a region extraction unit, a region determination unit, and a designation unit. The calculation unit is configured to calculate an evaluation amount with respect to the poor color tone for each pixel of an input image based on a predetermined color component. The pixel extraction unit is configured to extract candidate pixels constituting an image region indicating the poor color tone based on the evaluation amount. The region extraction unit is configured to extract a candidate region of a predetermined shape that includes the candidate pixels. The region determination unit is configured to performs a first determination relating to the evaluation amount in the candidate region and the evaluation amount in a peripheral region of the candidate region, a second determination relating to one of the evaluation amount of a predetermined hue of pixels in the candidate region and a predetermined color component, a third determination relating to luminance in the peripheral region, a fourth determination relating to one of hue and saturation in the peripheral region, and a fifth determination relating to edge intensity in the peripheral region. The designation unit is configured to designate, as a correction region, the candidate region satisfying at least one of the first through fifth determinations performed by the region determination unit.

According to another aspect of the present invention, an image processing method for detecting an image region indicating a poor color tone of eyes includes: calculating an evaluation amount with respect to the poor color tone for each pixel of an input image based on a predetermined color component; extracting candidate pixels constituting an image region indicating the poor color tone based on the evaluation amount; extracting a candidate region of a predetermined shape that includes the candidate pixels; performing a determination relating to a characteristic amount of a peripheral region of the candidate region; updating the candidate region based on a determination result obtained by performing the determination relating to the characteristic amount of the peripheral region of the candidate region; performing a determination relating to an edge intensity of a peripheral region of the updated candidate region; and detecting the image region indicating the poor color tone based on a determination result obtained by performing the determination relating to an edge intensity of the peripheral region of the updated candidate region.

According to yet another aspect of the present invention, an image processing method for detecting an image region indicating a poor color tone of eyes includes: calculating an evaluation amount with respect to the poor color tone for each pixel of an input image based on a predetermined color component; extracting candidate pixels constituting an image region indicating the poor color tone based on the evaluation amount; extracting a candidate region of a predetermined shape that includes the candidate pixels; performing a first determination relating to the evaluation amount in the candidate region and the evaluation amount in a peripheral region of the candidate region, a second determination relating to one of the evaluation amount of a predetermined hue of pixels in the candidate region and a predetermined color component, a third determination relating to luminance in the peripheral region, a fourth determination relating to one of hue and saturation in the peripheral region, and a fifth determination relating to edge intensity in the peripheral region; and designating, as a correction region, the candidate region satisfying at least one of the first through fifth determinations performed.

According to yet another aspect of the present invention, an image processing apparatus configured to detect an image region indicating a poor color tone of eyes from candidate regions includes: a first determination unit, a second determination unit, and a third determination unit. The first determination unit performs a determination relating to an evaluation amount with respect to the poor color tone based on a predetermined color component in a target candidate region, and the evaluation amount in a peripheral region of the candidate region. The second determination unit updates the candidate region based on a determination result obtained by the first determination unit, and performs a determination relating to one of the evaluation amount and a predetermined color component with reference to pixels in an updated second candidate region. The third determination unit updates the second candidate region based on a determination result obtained by the second determination unit, and performs a determination relating to a characteristic amount of a peripheral region with reference to pixels in a peripheral region of an updated third candidate region. A calculation amount of the determination performed by the third determination unit is greater than a calculation amount of the determination performed by one of the first determination unit and the second determination unit.

According to still another aspect of the present invention, an image processing method for detecting an image region indicating a poor color tone of eyes from candidate regions includes: performing a first determination relating to an evaluation amount with respect to the poor color tone based on a predetermined color component in a target candidate region, and the evaluation amount in a peripheral region of the candidate region; updating the candidate region based on a determination result obtained by performing the first determination; performing a second determination relating to one of the evaluation amount and a predetermined color component with reference to pixels in an updated second candidate region; updating the second candidate region based on a determination result obtained by the second determination; and performing a third determination relating to a characteristic amount of a peripheral region with reference to pixels in a peripheral region of an updated third candidate region. A calculation amount of the third determination is greater than a calculation amount of the first determination and the second determination.

An image region indicating a poor color tone of eyes can be accurately detected. Therefore, regardless of a photographed person who may have bright or dark pigments, an image region indicating a poor color tone of eyes (i.e., an image region to be corrected) can be appropriately detected.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B illustrate an exemplary result of adaptive binarization processing.

FIGS. 6A and 6B illustrate an exemplary speeding-up method for obtaining an average value Er(ave).

FIGS. 13A through 13C illustrate exemplary definitions of a peripheral region used in the calculation of characteristic amounts of a red-eye candidate region.

FIGS. 14A and 14B illustrate exemplary peripheral regions where a red-eye candidate region is present near an edge of an image.

FIG. 26 illustrates a center distance "Size."

FIG. 27 illustrates an exemplary relationship between the center distance "Size" and a threshold Th_Size.

FIGS. 28A and 28B illustrate a problem to be solved in a fourth exemplary embodiment.

FIG. 31 illustrates an example of a candidate region list.

FIGS. 32A and 32B illustrate exemplary candidate region connection processing.

DETAILED DESCRIPTION OF THE EMBODIMENTS

Figure 1:
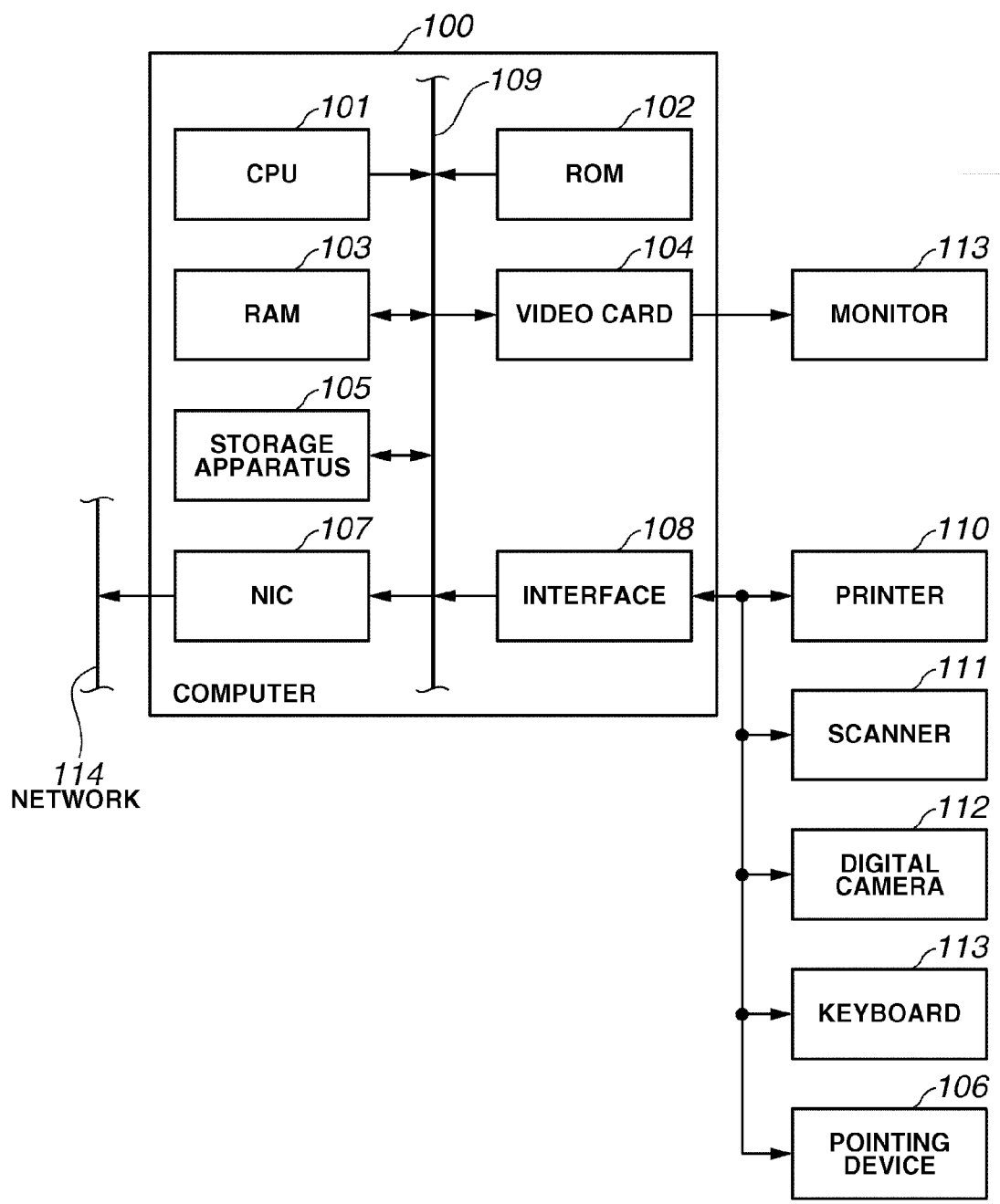
FIG. 1 is a block diagram illustrating an exemplary arrangement of a computer (i.e., an image processing apparatus) that can execute image processing in accordance with a first exemplary embodiment.

The following description of exemplary embodiments is merely illustrative in nature and is in no way intended to limit the invention, its application, or uses.

Processes, techniques, apparatuses, and materials as known by one of ordinary skill in the art may not be discussed in detail but are intended to be part of the enabling description where appropriate. For example, certain circuitry for signal processing, calculating, evaluating, and others may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described with reference to one figure, it may not be discussed for following figures.

Exemplary embodiments will be described in detail below with reference to the drawings.

The image processing described in the exemplary embodiments can be incorporated into a printer driver operable in a computer to generate image information to be output to a printer engine, or into a scanner driver operable in a computer to drive a scanner or another optical reading apparatus.

Furthermore, the image processing of the exemplary embodiments can be realized by the hardware, such as a copying machine, a facsimile, a printer, a scanner, a digital camera, and a digital video camera, or can be realized by the software supplied to these devices.

First Exemplary Embodiment

Apparatus Arrangement

FIG. 1 is a block diagram illustrating an exemplary arrangement of a computer (i.e., an image processing apparatus) that can execute image processing according to a first exemplary embodiment.

A computer 100 includes a central processing unit (CPU) 101, a read-only memory (ROM) 102, a random access memory (RAM) 103, a video card 104 connectable to a monitor 113 (that can be equipped with a touch panel), a storage apparatus 105 that includes, for example, a hard disk drive or a memory card, a network interface card (NIC) 107 connectable to a network 114, and a serial bus interface 108 that includes, for example, a universal serial bus (USB) or IEEE1394 interface and is connectable to a pointing device 106 (e.g., a mouse, a stylus, or a tablet), a keyboard 113, a printer 110, a scanner 111 (e.g., a film scanner), and a digital camera 112.

The constituent elements (or functional components) of the computer 100 are connected with a system bus 109.

The CPU 101 can read programs (including the program of image processing described in the following description) from the ROM 102 or the storage apparatus 105 and can load the readout programs to the RAM 103 serving as a work memory to execute the programs. The CPU 101 can control the above-described constituent elements via the system bus 109 according to the programs, to realize functions of the programs. FIG. 1 shows an ordinary hardware arrangement that can implement image processing according to the first exemplary embodiment. The hardware arrangement of the present invention is not limited to that disclosed in FIG. 1 and can be modified in a way to exclude part of the disclosed device(s) or include other device(s).

Overview of Processing

Figure 2:
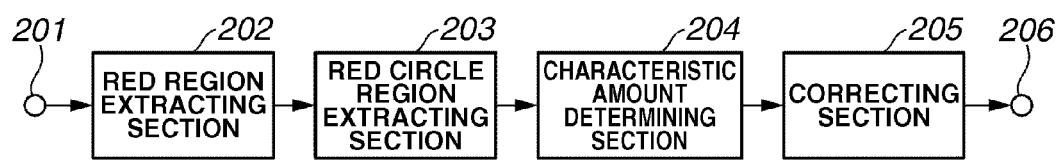
FIG. 2 is a functional block diagram showing automatic red-eye correction processing in accordance with the first exemplary embodiment.

FIG. 2 is a functional block diagram showing automatic red-eye correction processing according to the first exemplary embodiment, which the CPU 101 can execute. The CPU 101 can input digital image data of 24 bits (i.e., 8 bits for each of RGB) per one pixel from the digital camera 112 or the scanner 111.

Figure 3:
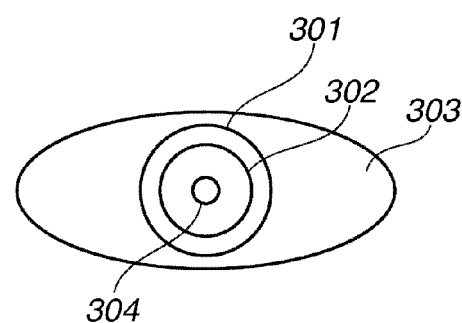
FIG. 3 illustrates a red eye image obtainable from a digital camera or another imaging apparatus.

FIG. 3 illustrates an exemplary red eye image obtainable from the digital camera 112 or another imaging apparatus. The eye image shown in FIG. 3 includes an iris region 301, a pupil region 302, and a white region 303 in addition to a highlight region 304 caused by the photographing flash. In general, a red-eye phenomenon can be referred to as a phenomenon that the pupil region 302 appears red.

A red region extracting section 202 shown in FIG. 2 can extract red regions from image data entered from an input terminal 201. The present exemplary embodiment employs an adaptive binarization to extract red regions, although there are various methods for extracting red regions. The red region extracting section 202 can extract any red regions other than red eyes, such as red traffic signals, red clothing patterns, and red illuminations.

A red circle region extracting section 203, based on input image data and information relating to extracted red regions, can specify red circle regions having a relatively circular shape from the extracted red regions. The present exemplary embodiment employs a "borderline tracing" method for extracting red circle regions, although there are various methods for determining the shape of each read region. The red circle region extracting section 203 can store position information on extracted red circle regions into a candidate region list.

A characteristic amount determining section 204 can perform, based on input image data and the candidate region list, determination processing for identifying various characteristic amounts representing eyes, with respect to the red circle regions stored in the candidate region list. The characteristic amounts representing eyes can include saturation of a red circle region as well as luminosity (intensity), saturation, hue, edge distribution of a peripheral region of the red circle. The characteristic amount determining section 204 compares the characteristic amounts with predetermined thresholds, and specifies each red circle region as a red eye region if it satisfies all conditions. The characteristic amount determining section 204 can store position information on each specified red eye region into the candidate region list.

A correcting section 205 can perform, based on input image data and the candidate region list storing the position information on red eye regions, correction processing for correcting red eye regions on the image data. The correcting section 205 can output the corrected image data to an output terminal 206. The corrected image data can be displayed on the monitor 113, or can be stored in the RAM 103 or in the storage apparatus 105. Furthermore, the corrected image data can be sent to the printer 110 via the interface 108 so that the printer 110 can print an image, or can be transmitted from the NIC 107 to another computer or to a server via the network 114 (including an intranet or the Internet).

Red Region Extracting Section 202

The red region extracting section 202 applies adaptive binarization processing to input image data to extract red regions from the image data. More specifically, the red region extracting section 202 calculates a red evaluation amount representing redness for each pixel of input image data, and compares the evaluation amount to a threshold. When the red evaluation amount is greater than the threshold (i.e., evaluation amount>threshold), the red region extracting section 202 determines that a target pixel is a red pixel. The threshold can be adaptively determined in a peripheral region of the target pixel. Through the "binarization" processing in the present exemplary embodiment, "1" is allocated to red pixels and "0" is allocated to other pixels.

Figure 4:
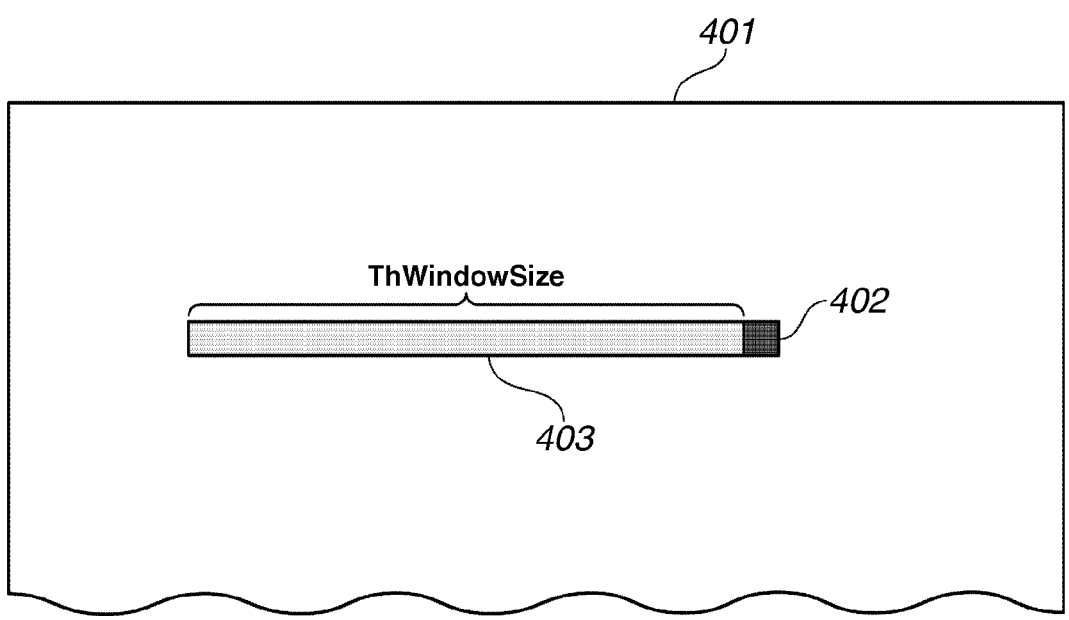
FIG. 4 illustrates exemplary adaptive binarization processing.

FIG. 4 illustrates exemplary adaptive binarization processing performed by the red region extracting section 202. In FIG. 4, a target pixel 402 of input image data 401 is an object pixel to be processed in the binarization processing. The red region extracting section 202 defines an evaluation amount Er representing redness of the target pixel 402 by the following formula (3).

$$Er=(R-G)/R \qquad (3)$$

As understood from the formula (3), the red region extracting section 202 can calculate the redness of target pixel 402 from R (red) and G (green) components, excluding a B (blue) component, without relying on the saturation in the general HIS expression. Using the formula (3) defining the red red evaluation amount Er can bring the following advantages.

For example, a person having dark (or deep) pigments cannot have clear or bright red eyes due to insufficient transmissivity of a crystalline lens of the pupil region 302. As described previously, estimated pixel values of a red eye region of a typical Japanese person are (R, G, B)=(109, 58, 65). The skin colors of Japanese people have a distribution concentrated from red (0 degree) to yellow (60 degrees) in terms of hue, as apparent from experimental results. In the above region, R, G and B components have a relationship of R>G>B. The skin region around eyes has estimated pixel values of (R, G, B)=(226, 183, 128).

As apparent from the practical values, the pixels of a red eye region and the pixels of a skin region around eyes have smaller B components. The pixels of a red eye region have a saturation value of 40, while the pixels of a skin region around eyes have a saturation value of 43. In other words, there is no substantial difference in the saturation value between the pixels constituting a red eye region and the pixels constituting a skin region. Accordingly, it will be difficult to detect a red eye region if a threshold for the adaptive binarization processing is saturation.

On the other hand, when the red evaluation amount Er is defined by the formula (3), i.e., an evaluation amount not relying on the B component, the pixels of a red eye region have a red evaluation amount Er of 47, while the pixels of a skin region around eyes have a red evaluation amount Er of 19. In other words, the red evaluation amount Er of the pixels in a red eye region is approximately twice the red evaluation amount Er of the pixels in a skin region.

From the foregoing, in the detection of red eyes of a person having dark (deep) pigments, the pixels constituting a red eye can be accurately extracted if the evaluation amount is defined by R and G components only (i.e., without including a B component) as defined in the formula (3), i.e., without relying on the saturation. However, definition of the evaluation amount Er is not limited to the formula (3), i.e., a ratio of (R−G) to R. For example, the evaluation amount Er can be defined as (R−G) or R/G.

When the evaluation amount is defined by R and G components only (i.e., without including a B component) as defined in the formula (3), i.e., without relying on the saturation, the pixels constituting a red eye can be accurately extracted in the detection of red eyes of a person having bright pigments.

Referring back to FIG. 4, to binarize the target pixel 402, the red region extracting section 202 sets a window region 403 extending from the target pixel 402 along a line, so that a pixel number "ThWindowSize" is present at the left side of the target pixel 402 (i.e., at a forward region in the main scanning direction). The red region extracting section 202 can obtain an average value Er(ave) of red evaluation amounts Er about the pixels within the window region 403. The pixel number "ThWindowSize" can have a width equivalent to 1 to 2% of a shorter side of the image. The evaluation amount Er does not take a negative value, because the conditions shown in the following formula (4) must be satisfied when the evaluation amount Er is calculated.

$$R>0, \text{ and } R>G \qquad (4)$$

The red region extracting section 202 uses the calculated average value Er (ave) to binarize the target pixel 402. To perform the processing, the target pixel 402 must satisfy the following conditions.

$$R>Th\_Rmin, R>G, \text{ and } R>B \qquad (5)$$

In the formula (5), "Th_Rmin" is a threshold representing a lower limit value of R. When the above-described conditions are satisfied, the red region extracting section 202 executes the binarization processing with the following formula (6).

If $Er>Er(\text{ave})+\text{Margin\_RGB}$, take a value '1'

If $Er \leq Er(\text{ave})+\text{Margin\_RGB}$, take a value '0' \qquad (6)

In the formula (6), "Margin_RGB" represents a parameter.

When the red evaluation value Er of the target pixel 402 is greater than an addition of the average value Er(ave) of the window region 403 and "Margin_RGB", the red region extracting section 202 allocates a value '1' to the target pixel 402 as a result of the binarization processing. In other words, the target pixel 402 is extracted as a red region.

If red regions are continuously present, the average value Er(ave) will become an excessively large value. Therefore, an upper limit can be set with respect to the average value Er (ave). The binarization result can be stored in a predetermined region in the RAM 103 other than a buffer region allocated to an input image.

The red region extracting section 202 performs the above-described processing, for each line of input image data, by shifting the target pixel 402 from left to right in the entire region of an image. In the first exemplary embodiment, the threshold for the binarization (i.e., the average value Er(ave)) is calculated based on evaluation values of the pixels within a window extending from the target pixel 402 to the left along the same line.

However, the threshold for the binarization is not limited to a particular one. For example, the window can be set as a region including plural pixels positioned at the left side of the target pixel 402 (i.e., a forward region in the main scanning direction) in several lines above the target pixel 402 (i.e., a forward region in the sub scanning direction). Furthermore, the window can be set to a rectangular region having its center on the target pixel 402.

FIGS. 5A and 5B illustrate an exemplary result of adaptive binarization processing. FIG. 5A shows an image of a red eye and its peripheral region contained in the input image data.

FIG. 5B shows a binarized image resulting from the adaptive binarization processing, which extracts only the pixels of a pupil region of a red eye.

Furthermore, to obtain an average value Er(ave) of evaluation amounts within the window set in the main scanning direction, the following speeding-up method can be used.

FIGS. 6A and 6B illustrate an exemplary speeding-up method for obtaining the average value Er(ave).

The red region extracting section 202 calculates the evaluation amount Er in the window 403 provided at the left side of the target pixel 402 as shown in FIG. 6A, and stores a sum of calculated evaluation amounts in a memory (e.g., the RAM 103). Then, the red region extracting section 202 divides the sum of calculated evaluation amounts by a pixel number n constituting the window 403 to obtain the average value Er(ave).

Next, the red region extracting section 202 shifts the target pixel 402 to the right by one pixel. The window 403 also shifts to the right by one pixel. In this case, a sum of evaluation amounts in the window 403 shown in FIG. 6B can be speedily obtained by subtracting an evaluation amount Er of a pixel 501 from the stored sum and then adding an evaluation amount Er of a pixel 502 (i.e., a pixel positioned immediately before the target pixel 402).

In other words, the red region extracting section 202 does not need to calculate the evaluation amount Er for each pixel within the window 403 every time the target pixel 402 and the window 403 shift along the line.

Red Circle Region Extracting Section 203

The red circle region extracting section 203 extracts red circle regions based on a borderline tracing method which is one of binarized image processing methods.

Figure 7:
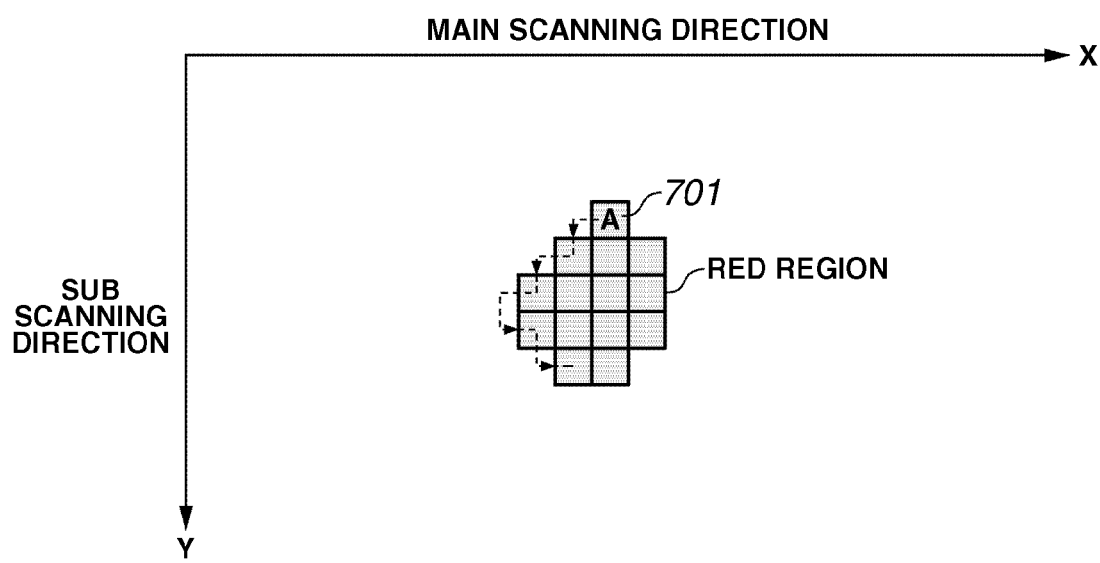
FIG. 7 illustrates an exemplary borderline tracing method.

FIG. 7 illustrates an exemplary borderline tracing method. The red circle region extracting section 203 applies the borderline tracing processing to a binarized image resulting from the adaptive binarization processing, by scanning the image from the upper end in both the main and sub scanning directions.

A target pixel (xa, ya), i.e., a pixel 701 shown in FIG. 7, positioned at a starting point has a value '1.' A pixel (xa−1, ya) positioned at the left of the target pixel has a value '0.' A pixel (xa−1, ya−1) positioned at the oblique upper left of the target pixel has a value '0.' A pixel (xa, ya−1) positioned above the target pixel has a value '0.' A pixel (xa+1, ya−1) positioned at the oblique upper right of the target pixel has a value '0.'

The coordinate system shown in FIG. 7 has an origin at the upper left corner of a binarized image. The red circle region extracting section 203 successively tracks pixels having a value '1' in the counterclockwise direction and returns to the starting point 701. When the tracing locus excurses out of an image region or deviates toward a smaller Y-coordinate region compared to the starting point pixel 701, the red circle region extracting section 203 stops tracing and finds a next starting point.

Figure 8:
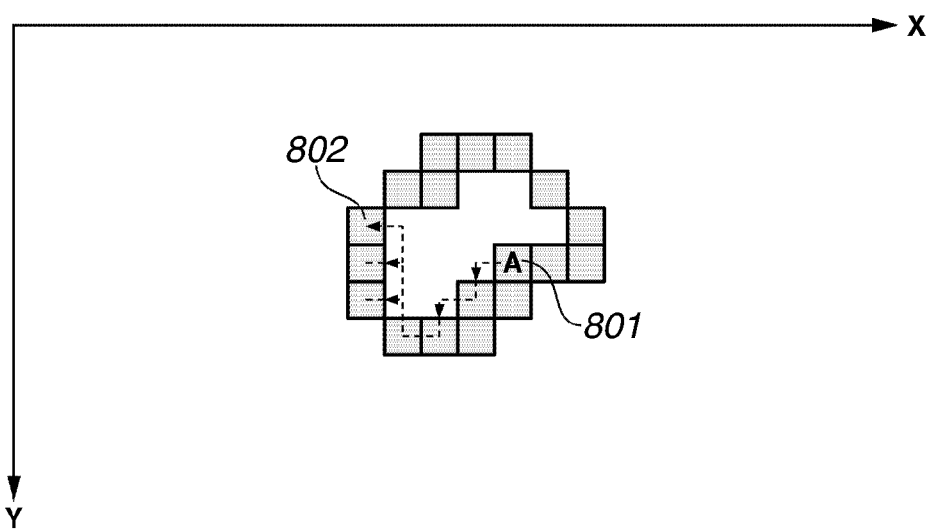
FIG. 8 illustrates an exemplary borderline tracing method.

If the tracing movement continues in a region having Y-coordinate values smaller than that of the starting point pixel 701, the red circle region extracting section 203 will erroneously track along the inside of an annular region shown in FIG. 8. In the example shown in FIG. 8, when a tracing point reaches a pixel 802 along the inside of the annular region, the Y-coordinate value of the tracing point becomes smaller than that of a starting point pixel 801. The red circle region extracting section 203 thus stops tracing.

In the above-described tracing process, the red circle region extracting section 203 can obtain a peripheral length of a tracing object region, a histogram of tracing directions, and maximum and minimum values in the X and Y coordinates. The peripheral length can be expressed in terms of a total number of pixels being tracked. For example, according to the example shown in FIG. 7, the peripheral length is nine pixels including the starting point pixel 701.

Figures 9, 10:
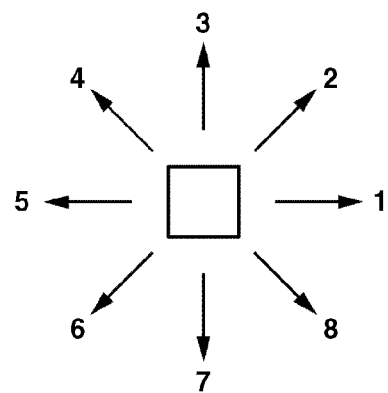
FIG. 9 is view illustrating classified directions for a histogram of tracing directions.
FIG. 10 illustrates an exemplary histogram of tracing directions.

The tracing directions can be classified into a total of eight directions shown in FIG. 9, as possible directions shifting from one pixel to the next pixel during the tracing operation. In the example shown in FIG. 7, the shifting direction successively changes in the order of 6→6→7→8→1→2→3 →3 →4 as defined in FIG. 9, in accordance with the tracing starting from the point pixel 701 in the counterclockwise direction. FIG. 10 shows a histogram of directions.

Figure 11:
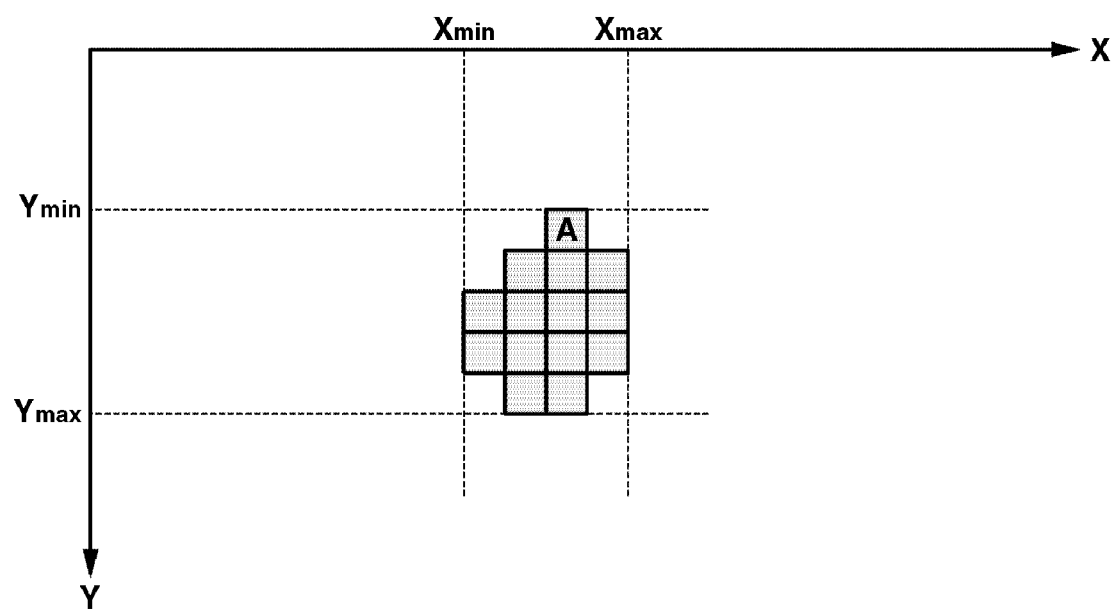
FIG. 11 illustrates an exemplary rectangular region circumscribing a red region.

FIG. 11 shows maximum and minimum values in the X and Y coordinates, which represent a region where pixels having a value of '1' are present, i.e., a rectangular region circumscribing a red region. The red circle region extracting section 203 tracks a borderline of each red region to obtain the above-described values, and determines whether this region is a red circle region.

Figure 12:
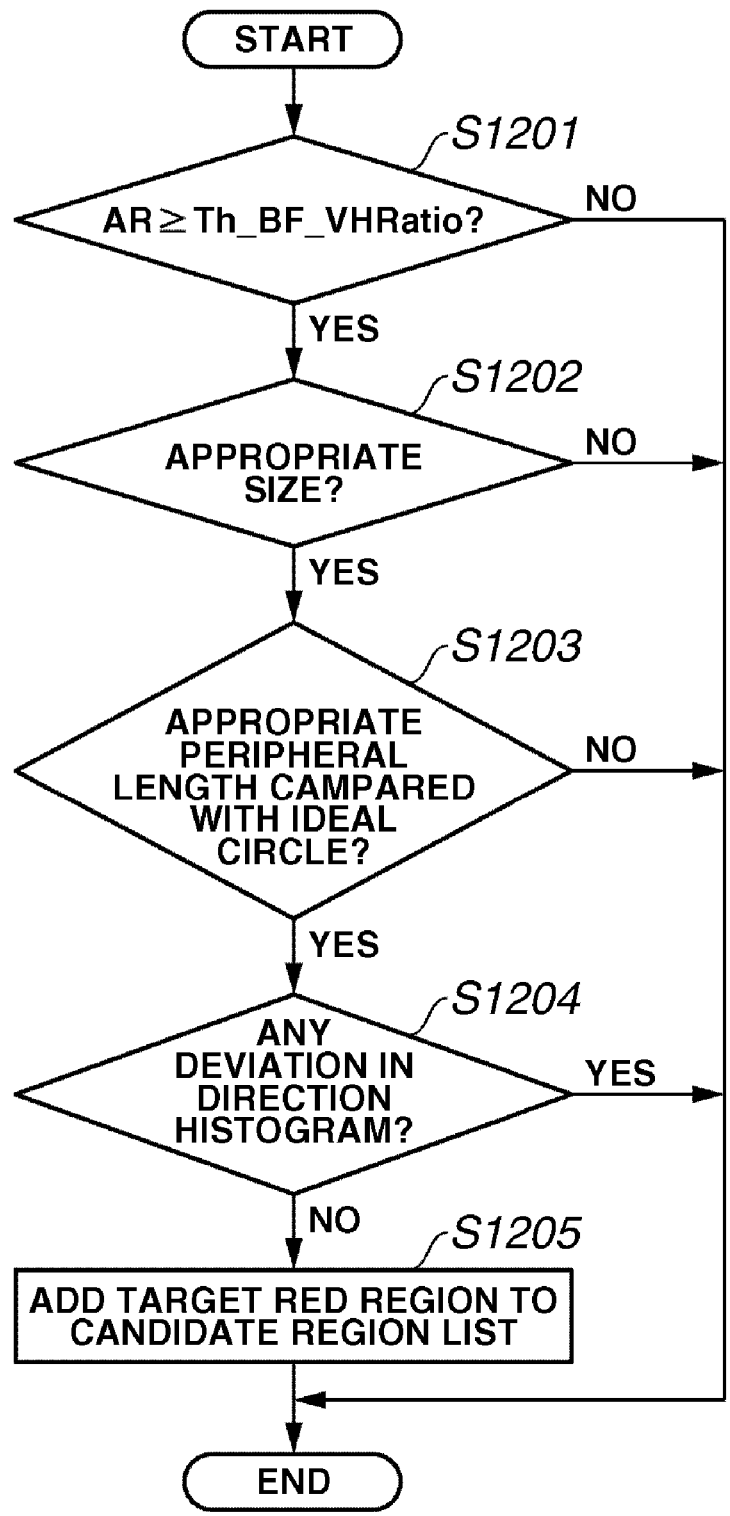
FIG. 12 is a flowchart illustrating exemplary determination processing for determining whether a red circle region is present.

FIG. 12 is a flowchart illustrating exemplary determination processing for determining whether a red circle region is present. First, the red circle region extracting section 203 determines whether an aspect ratio of a red region is equal to or greater than a predetermined threshold Th_BF_VHRatio (step S1201). The red circle region extracting section 203 calculates an aspect ratio AR according to the following formula (7).

$$AR=(y\max-y\min)/(x\max-x\min) \qquad (7)$$

In the formula (7), when AR>1, AR=1/AR

Namely, the aspect ratio AR can be expressed as a value in the range from 0.0 to 1.0. When AR=1.0, a vertical length is equal to a horizontal length. When the aspect ratio AR is smaller than the threshold Th_BF_VHRatio (i.e., AR<Th_BF_VHRatio, NO in step S1201), the red circle region extracting section 203 determines that the target red region is not a red circle region and begins searching for the next red region (i.e., processing ends).

When AR≧Th_BF_VHRatio (i.e., YES in step S1201), the red circle region extracting section 203 determines whether the red region has an appropriate size (step S1202). The red circle region extracting section 203 performs a determination relating to the size considering two items, i.e., (1) upper and lower limits of actual pixel number, and (2) a ratio of the red region to a shorter side or a longer side of the image.

First, with respect to the above item (1), the red circle region extracting section 203 identifies a smaller one between a horizontal width X (=xmax−xmin) and a vertical width Y(=ymax−ymin) of the red region, and compares the identified smaller width to predetermined thresholds. More specifically, the red circle region extracting section 203 determines whether the identified smaller width (i.e., the vertical width or the horizontal width) is within a range between an upper limit Th_BF_SizeMax and a lower limit Th_BF_SizeMin.

When the identified smaller width is greater than the upper limit or smaller than the lower limit, the red circle region extracting section 203 determines that the target red region is not a red circle region and begins searching for the next red region.

Furthermore, with respect to the above item (2), the red circle region extracting section 203 employs the following formula (8).

$$Th\_BF\_RatioMin<\min(X, Y)/\min(W, H)<Th\_BF\_RatioMax \qquad (8)$$

where, X=xmax−xmin, Y=ymax−ymin, W represents a width of the input image, and H represents a height of the input image.

When the target red region does not satisfy the formula (8), the red circle region extracting section 203 determines that the target red region is not a red circle region (i.e., NO in step S1202) and begins searching for the next red region (i.e., processing ends). Although the formula (8) is based on an example comparing two shorter sides, it is possible to compare two longer sides.

When the red region has an appropriate size (i.e., YES in step S1202), the red circle region extracting section 203 compares a peripheral length with an ideal circumference to determine whether the extracted red region is similar to a circle (step S1203). The red circle region extracting section 203 obtains an ideal circumference Ci based on the width X and the height Y of a red region according to the approximation defined by the following formula (9).

$$Ci=(X+Y)\times 2\times 2\pi/8 \quad (9)$$

The formula (9) is based on the assumption that the extracted red region is a square. The ideal circumference Ci defines a circumference of an inscribed circle of this square. In formula (9), "(X+Y)×2" represents a total length of four sides of a square containing a red region, and "2π/8" represents a ratio of the total length of four sides of a square to a circumference of an inscribed circle of this square.

The red circle region extracting section 203 compares the above-described ideal circumference Ci with the peripheral length according to the following formula (10). When the formula (10) is not satisfied (NO in step S1203), the red circle region extracting section 203 determines that the extracted red region is not a red circle region and begins searching for the next red region, i.e., ends processing.

$$\min(Ci, Cx)/\max(Ci, Cx) > Th\_BF\_CircleRatio \quad (10)$$

In the formula (10), Cx represents the peripheral length. When the peripheral length satisfies the formula (10), the red circle region extracting section 203 determines whether any deviation is present in the histogram of tracing directions (step S1204).

As described previously, in the borderline tracing process, the red circle region extracting section 203 can obtain the histogram of tracing directions shown in FIG. 10. When a tracing object region is similar to a circle, distribution of tracing directions is uniform in the histogram resulting from the borderline tracing processing. On the other hand, when a tracing object region is long and narrow, the histogram of tracing directions has a deviation. For example, if a tracing object region has a long and narrow shape extending from the upper right to the lower left, the frequency of directions 2 and 6 shown in FIG. 9 becomes large and the frequency of directions 4 and 8 becomes small.

Accordingly, when all of the conditions shown in the formula (11) are satisfied, the red circle region extracting section 203 determines that the target red region is a red circle region. When any one of the conditions is not satisfied, the red circle region extracting section 203 determines that the target red region is not a red circle region and begins searching for the next red region.

$$\text{sum}(f1, f2, f5, f6) < \Sigma f \times Th\_BF\_DirectRatio$$

$$\text{sum}(f2, f3, f6, f7) < \Sigma f \times Th\_BF\_DirectRatio$$

$$\text{sum}(f3, f4, f7, f8) < \Sigma f \times Th\_BF\_DirectRatio$$

$$\text{sum}(f4, f5, f8, f1) < \Sigma f \times Th\_BF\_DirectRatio \quad (11)$$

where, fn represents the frequency of direction n, sum(fa, fb, fc, fd) represents a sum of the frequencies of directions a, b, c, and d, and Σf represents a sum of frequencies.

If a sum of frequencies in a predetermined direction exceeds a predetermined rate in the formula (11); namely when the distribution of tracing directions concentrates at a certain direction, the red circle region extracting section 203 can decide that the target red region is not a red circle region. Furthermore, according to the determination by the formula (11), the determination accuracy may deteriorate when the frequency sum Σf is small. Thus, when the frequency sum Σf is equal to or less than a predetermined value, the red circle region extracting section 203 can skip the processing of step S1204 and can directly proceed to the next step S1205.

The red circle region extracting section 203 determines every red region satisfying all determinations of steps S1201 through S1204 (or determinations of steps S1201 through S1203 if step S1204 is skipped) as a red circle region (i.e., a red-eye candidate region). The red circle region extracting section 203 stores coordinates positions of each detected red circle region in a candidate region list allocated in the RAM 103 (step S1205). The red circle region extracting section 203 repeats the borderline tracing and the determinations shown in the flowchart of FIG. 12 until the tracing position reaches the lower right position of image data.

Characteristic Amount Determining Section 204

The characteristic amount determining section 204 calculates various characteristic amounts representing a human's red eye, for each extracted red circle region (i.e., each red-eye candidate region), and compares the calculated characteristic amounts to predetermined thresholds and determines whether the extracted red circle region is a red eye.

Figure 16:
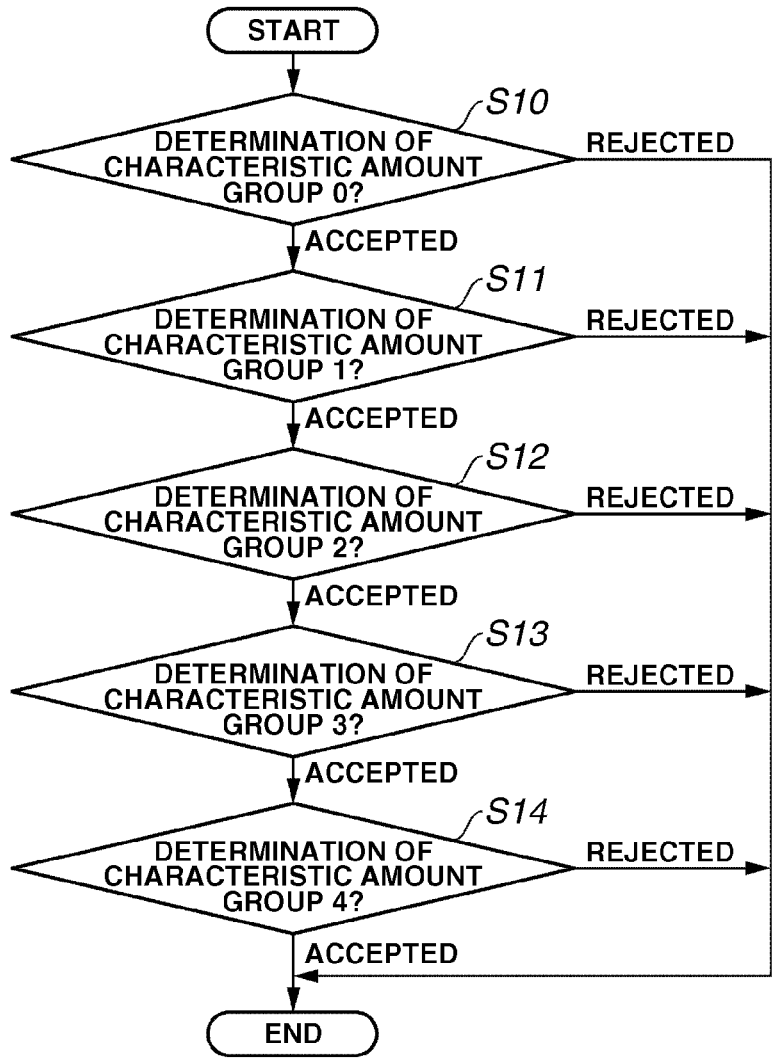
FIG. 16 is a flowchart showing an exemplary procedure for determining a characteristic amount group.

The characteristic amount determining section 204 executes the following determinations applied to five characteristic amount groups in the order shown in the flowchart of FIG. 16, with respect to red-eye candidate regions recorded in the candidate region list obtained by the red circle region extracting section 203.

Characteristic amount group 0: comparison between a red circle region and an average value Er(ave) of evaluation amounts in a peripheral region (step S10)

Characteristic amount group 1: determination relating to changes in hue, evaluation amount Er, color components in a red circle region (step S11)

Characteristic amount group 2: determination relating to luminance in the peripheral region (step S12)

Characteristic amount group 3: determination relating to saturation and hue in the peripheral region (step S13)

Characteristic amount group 4: determination relating to edge intensity in the peripheral region (step S14)

The red component of an ideal red eye region is present in a pupil region, and is clearly discriminable from its peripheral region. This is an excellent characteristic amount, compared with other various characteristic amounts. Accordingly, the characteristic amount determining section 204 first executes the determination processing of characteristic amount group 0 (step S10), to efficiently detect a red-eye candidate region.

The determination of characteristic amount group 1 (step S11) requires a smaller amount of calculations compared with the determinations of other characteristic amount groups, because the characteristic amount determination can be performed by referring to only the pixels in a red circle candidate region.

The determination of characteristic amount group 2 and the determination of characteristic amount group 3 (steps S12 and S13) require converting the R, G and B components into luminance and color difference components, with respect to the pixels presenting in a predetermined peripheral region, or require converting the R, G and B components into luminosity (intensity), saturation, and hue components.

Thus, the determination of characteristic amount group 2 and the determination of characteristic amount group 3 require a relatively larger amount of calculations compared with the determination of characteristic amount group 1.

The determination of characteristic amount group 4 (step S14) uses a conventionally known edge detection filter, such as a Sobel filter, and obtains an edge intensity. The determination of characteristic amount group 4 requires the largest amount of calculations compared with the determinations of other characteristic amount groups.

In view of the foregoing, the characteristic amount determining section 204 performs the above-described five determinations in the order of smallness in the calculation amount, i.e., in the order of easiness in identifying the characteristics of a red eye region.

As shown in the flowchart of FIG. 16, when a red-eye candidate region is decided to be a non-red eye region, the characteristic amount determining section 204 skips the succeeding determination steps to reduce the entire processing amount.

<Definition of Peripheral Region>

FIGS. 13A through 13C illustrate exemplary definitions of a peripheral region used in the calculation of characteristic amounts for a red-eye candidate region.

In FIGS. 13A through 13C, a central block 1301 is a circumscribed rectangle of a red-eye candidate region (red circle region) extracted by the red circle region extracting section 203.

FIG. 13A shows an exemplary peripheral region including the central block 1301 at its center and having vertical and horizontal sides twice the corresponding sides of the central block 1301.

FIG. 13B shows an exemplary peripheral region including the central block 1301 at its center and having vertical and horizontal sides three times the corresponding sides of the central block 1301.

FIG. 13C shows an exemplary peripheral region including the central block 1301 at its center and having vertical and horizontal sides five times the corresponding sides of the central block 1301.

In the following description, an "entire peripheral region" is a portion obtained by excluding the central block 1301 from a rectangular peripheral region. Furthermore, "blocks in the peripheral region" is eight blocks of the peripheral region dissected by four broken lines including and extending from the four sides of the central block 1301 as shown in FIGS. 13A through 13C.

The characteristic amount determining section 204 applies the determination to the peripheral regions of respective characteristic amount groups except for the characteristic amount group 1. The setting of such a peripheral region requires referring to a region having a size equivalent to five times, at maximum, a circumscribed rectangle of a red-eye candidate region. Thus, the determination processing can be speedily accomplished.

FIGS. 14A and 14B illustrate exemplary peripheral regions where a red-eye candidate region is present near an edge of an image. FIG. 14A shows a circumscribed rectangle (i.e., a block 1301) of a red-eye candidate region positioned near the right edge of an image with a margin smaller than the side of the circumscribed rectangle.

In this case, if any pixel is present in each block of the peripheral region, the characteristic amount determining section 204 performs the characteristic amount determination based on the pixel included in the block of the peripheral region.

FIG. 14B shows a circumscribed rectangle (i.e., a block 1301) of a red-eye candidate region positioned near the right edge of an image with no margin. In this case, three peripheral blocks of top right (TR), right (R), and bottom right (BR) include no pixels. The characteristic amount determining section 204 cannot calculate the characteristic amounts of these peripheral blocks. In such a case, the characteristic amount determining section 204 in the first exemplary embodiment determines that the block 1301 is not a red eye region and excludes the red-eye candidate region corresponding to the block 1301 from the candidate region list.

<Determination of Characteristic Amount Group 0 (Refer to Step S10)>

In the determination of characteristic amount group 0, the characteristic amount determining section 204 sets a triple-length peripheral region including the block 1301, for example as shown in FIG. 13B, and calculates an evaluation amount Er of each pixel with the formula (3) for each block including the block 1301. Then, the characteristic amount determining section 204 calculates an average value Er (ave) of evaluation amounts.

The characteristic amount determining section 204 stores the calculated average value Er (ave) in an array AEvR[8] allocated in the RAM 103, where the array AEvR can hold nine (0-8) elements. More specifically, the element 0 is allocated to a top left (TL) block, the element 1 is allocated to a top (T) block, the element 2 is allocated to a top right (TR) block, - - - from the upper left block to the lower right block shown in FIG. 13A.

Next, the characteristic amount determining section 204 determines whether the following formula is satisfied with respect to each element i (i=0 to 8, except for i=4 corresponding to the block 1301).

$$AEvR[i] < AEvR[4] \times Th\_FJ0\_EvR \quad (12)$$

The right side of formula (12) represents a value obtained by multiplying an average value AEvR[4] of evaluation amounts in the block 1301 with a threshold Th_FJ0_EvR. The left side of formula (12) represents an average value AEvR[i] of evaluation amounts in the remaining eight peripheral blocks.

When the formula (12) is satisfied, the characteristic amount determining section 204 determines that the target red-eye candidate region is a red eye region. When the formula (12) is not satisfied, the characteristic amount determining section 204 determines that the target red-eye candidate region is not a red eye region and cancels the determinations of succeeding characteristic amount groups and restarts determinations for the next red-eye candidate region.

Among the characteristic amounts described below, the comparison of the evaluation amount Er defined in the formula (12) is most reliable in identifying a red eye region. This is the reason why the characteristic amount determining section 204 first executes the processing using the formula (12). Various experimental results have already revealed that the determination using the formula (12) is most effective to exclude non-red eye regions from the candidate region list. Accordingly, the characteristic amount determining section 204 can minimize the calculation amount by determining the order of determinations considering easiness in identifying the characteristics of a red eye region.

Figure 15A:
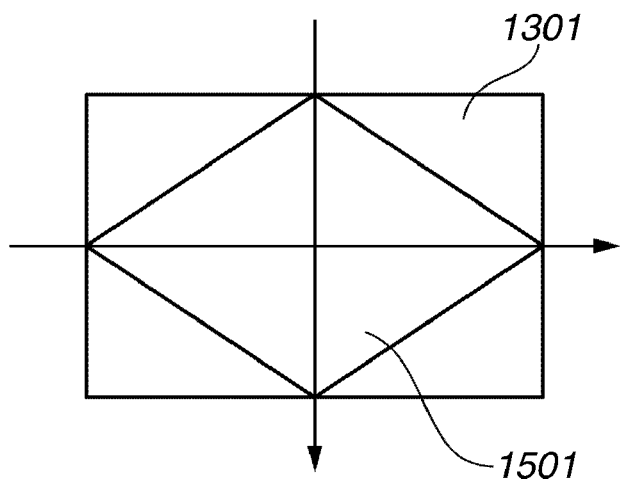
FIGS. 15A through 15C illustrate exemplary calculation regions for obtaining an average value Er(ave) in a block.

Furthermore, in the calculation of the average value Er(ave) of the block 1301, it can be applicable to calculate the evaluation value Er of pixels within a calculation region 1501 having a diamond shape shown in FIG. 15A.

The shape of a red eye region is generally a circle or an ellipse. Thus, pixels having smaller redness are present in the four corners of the block 1301. Thus, when the pixels existing in the four corners of the block 1301 are excluded in the calculation of the evaluation amount Er, the average value Er(ave) of evaluation amounts in the block 1301 does not decrease undesirably.

Figure 15B:
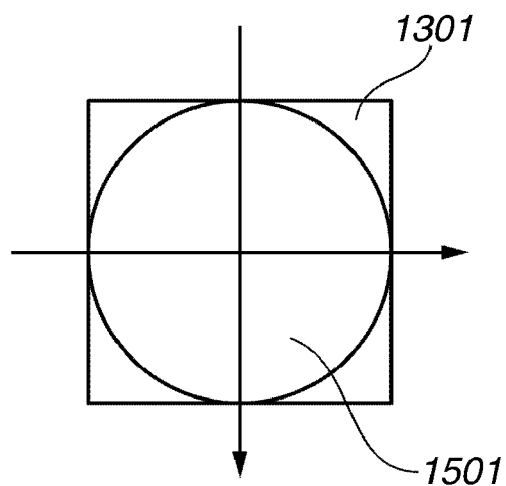
Figure 15C:
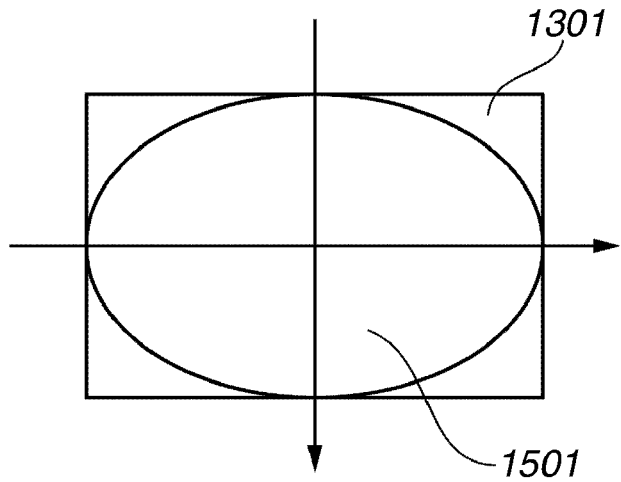

The calculation region of the evaluation value Er is not limited to the diamond shape shown in FIG. 15A. For example, an inscribed circle (refer to FIG. 15B) or an inscribed ellipse (refer to FIG. 15C) of the block 1301 can be used to obtain similar or better calculation results.

<Determination of Characteristic Amount Group 1 (Refer to Step S11)>

In the determination of characteristic amount group 1, the characteristic amount determining section 204 determines whether there is any red eye region by referring to only the image data in a red-eye candidate region (i.e., the block 1301 shown in FIGS. 13A to 13C). The determination of characteristic amount group 1 includes, for example, the following determination processing.

First, in a red-eye candidate region, the characteristic amount determining section 204 determines whether an average value Er (ave) of evaluation amounts of pixels having the hue within ±30 degrees is not smaller than a threshold Th_FJ1_EMin and is not greater than a threshold Th_FJ1_EMax. When a red-eye candidate region does not satisfy this determination, the characteristic amount determining section 204 excludes the red-eye candidate region from the candidate region list. The hue can be obtained by any well-known method.

Next, in the red-eye candidate region, the characteristic amount determining section 204 obtains a maximum value and a minimum value with respect to the evaluation amount Er of the pixels having the hue within ±30 degrees, and calculates a ratio R=minimum value/maximum value.

In the red-eye candidate region, the evaluation amount Er greatly changes and accordingly the ratio R is a relatively small value. Accordingly, the characteristic amount determining section 204 performs a determination defined by the following formula (13) and excludes any target red-eye candidate region not satisfying the formula (13) from the candidate region list.

$$R < Th\_FJ1\_EMaxMinRatio \quad (13)$$

Next, in the red-eye candidate region, the characteristic amount determining section 204 measures a standard deviation of an R component. In general, a red eye region involves a bright red region and a dark region extending along the border of a pupil. Accordingly, the R component has a very large dynamic range. If a deviation of the R component of a red eye region is measured, its value will be a significantly large value. Accordingly, in the red-eye candidate region, the characteristic amount determining section 204 measures a standard deviation δr of the R component according to a known method and determines whether the standard deviation δr is greater than a threshold Th_FJ1_RDiv.

$$\delta r > Th\_FJ1\_RDiv \quad (14)$$

When the formula (14) is not satisfied, the characteristic amount determining section 204 excludes the red-eye candidate region from the candidate region list. Although the above determination uses the standard deviation of the R component, a variance of the R component can also be used to perform a similar determination.

As another method for determining the degree of change in the R component, the characteristic amount determining section 204 can calculate an average value SDr(ave) of difference sums of the R component among neighboring pixels in the red-eye candidate region, and determine whether the average value SDr(ave) is greater than a threshold Th_FJ1_RDiff (refer to formula (15)).

$$SDr(ave) > Th\_FJ1\_RDiff \quad (15)$$

The characteristic amount determining section 204 can use various methods to calculate an average value of difference sums among neighboring pixels.

For example, the characteristic amount determining section 204 can calculate an average value of difference sums between a target pixel and eight neighboring pixels or between a target pixel and only a left neighboring pixel.

Furthermore, the characteristic amount determining section 204 can perform the above-described determination based on a G or B component, a luminance value, or an evaluation amount Er.

<Determination of Characteristic Amount Group 2 (Refer to Step S12)>

In the determination of characteristic amount group 2, the characteristic amount determining section 204 sets a peripheral region around a red-eye candidate region that is not excluded in the determination of characteristic amount group 1 and remains in the candidate region list, and performs determination processing relating to luminance components in the peripheral region. The determination of characteristic amount group 2, for example, includes the following determination processing.

First, the characteristic amount determining section 204 sets a peripheral region around a red-eye candidate region (e.g., the quintuple-length region shown in FIG. 13C). Next, the characteristic amount determining section 204 calculates an average luminance value Y(ave) about eight blocks of the peripheral region surrounding the block 1301 and determines whether the average luminance value Y (ave) is in the range from a threshold Th_FJ2_YMin and a threshold Th_FJ2_YMax.

When the average luminance value Y(ave) is not in the above range, i.e., when the periphery of the block 1301 is extremely bright or dark, the characteristic amount determining section 204 excludes the target red-eye candidate region from the candidate region list. In the above-described determination relating to luminance, the characteristic amount determining section 204 can obtain an average luminance value Y(ave) about eight blocks in the peripheral region, or can obtain an average luminance value Y(ave) of each block in the peripheral region and compare each average luminance value Y(ave) with a threshold being set for each block.

Next, the characteristic amount determining section 204 sets a double-length peripheral region around a red-eye candidate region (refer to FIG. 13A), and calculates an average luminance value Y(ave) about eight blocks of the peripheral region surrounding the block 1301. Furthermore, the characteristic amount determining section 204 obtains a maximum value Ymax and a minimum value Ymin of eight average luminance values.

In general, when a peripheral region is set to have a double-length size relative to the red-eye candidate region, the brightness of a peripheral region changes greatly. Thus, the characteristic amount determining section 204 performs the following determination.

$$(Y\max-Y\min)>Th\_FJ2\_MaxMinDiff2 \quad (16)$$

When the formula (16) is not satisfied, the characteristic amount determining section 204 excludes the target red-eye candidate region from the candidate region list.

On the other hand, the characteristic amount determining section 204 sets a quintuple-peripheral region around a red-eye candidate region (refer to FIG. 13C), and calculates an average luminance value Y (ave) about eight blocks of the peripheral region as described above. Furthermore, the characteristic amount determining section 204 obtains a maximum value Ymax and a minimum value Ymin of eight average luminance values.

In general, when a peripheral region is set to have a quintuple-length size relative to the red-eye candidate region, most of the peripheral region is a skin color region and accordingly the luminance value in this region does not change greatly. Accordingly, the characteristic amount determining section 204 performs the following determination.

$$(Y\max-Y\min)<Th\_FJ2\_MaxMinDiff5 \quad (17)$$

When the formula (17) is not satisfied, the characteristic amount determining section 204 excludes the target red-eye candidate region from the candidate region list.

<Determination of Characteristic Amount Group 3 (Refer to Step S13)>

In the determination of characteristic amount group 3, the characteristic amount determining section 204 sets a peripheral region around a red-eye candidate region that is not excluded from the candidate region list in the determination of characteristic amount group 1 and the determination of characteristic amount group 2, and performs determination processing relating to saturation and hue in the peripheral region. The determination of characteristic amount group 3, for example, includes the following determination processing.

First, the characteristic amount determining section 204 sets a peripheral region around a red-eye candidate region (e.g., the quintuple-length region shown in FIG. 13C), and calculates a ratio Rh of pixels having the hue of ±Th_FJ3_HRange about eight blocks of the peripheral region surrounding the block 1301. Because the peripheral region around a red eye region is a skin color region, the hue of most pixels is included in the above-described range.

Accordingly, when the calculated ratio Rh is not smaller than a threshold Th_FJ3_HRatio, the characteristic amount determining section 204 can recognize this region as a red-eye candidate region. When the calculated ratio Rh is less than the threshold Th_FJ3_HRatio, the characteristic amount determining section 204 excludes the target red-eye candidate region from the candidate region list. The characteristic amount determining section 204 can calculate the ratio Rh with the following formula (18).

$$Rh=Nh/\Sigma N \quad (18)$$

where, Nh represents a total number of pixels having the hue of ±Th_FJ3_HRange, and ΣN represents a total number of pixels included in eight blocks.

Next, the characteristic amount determining section 204 sets a peripheral region around a red-eye candidate region (e.g., the quintuple-length region shown in FIG. 13C), and calculates an average saturation S(ave) about eight blocks in the peripheral region. Then, the characteristic amount determining section 204 determines whether the average saturation S(ave) is in the range from a threshold Th_FJ3_SMin and a threshold Th_FJ3_SMax.

When the average saturation S(ave) is not in the above range, the characteristic amount determining section 204 excludes the target red-eye candidate region from the candidate region list.

The above-described determination of saturation can be performed for each block. Namely, the characteristic amount determining section 204 can calculate an average saturation S(ave) for each block in the peripheral region, and can compare the obtained average saturation S(ave) with a predetermined threshold.

Furthermore, the periphery of a red eye region is a so-called white eye region. Accordingly, in the peripheral region set around a red-eye candidate region (e.g., the triple-length region shown in FIG. 13B), a ratio S/L of saturation S to luminosity (intensity) L is not greater than a threshold Th_FJ3_WhitePix. More specifically, if a pixel having a small saturation S and a large luminosity (intensity) L is present, the characteristic amount determining section 204 can recognize this region as a red-eye candidate region. If the above-described determination result is denial, the characteristic amount determining section 204 excludes the target red-eye candidate region from the candidate region list.

<Determination of Characteristic Amount Group 4 (Refer to Step S14)>

In the determination of characteristic amount group 4, the characteristic amount determining section 204 sets a peripheral region around a red-eye candidate region that is not excluded in the determinations of characteristic amount group 1 through characteristic amount group 3 and remains in the candidate region list, and performs determination processing relating to an edge in the peripheral region.

In general, a very sharp edge is present in the vicinity of a human eye and can be used as characteristic amounts. In the following description, a Sobel filter is employed for the edge detection. However, other edge detection filters can be used to perform similar determination processing. The Sobel filter is conventionally well known and will not be described below in detail. The determination of characteristic amount group 4, for example, includes the following determination processing.

First, the characteristic amount determining section 204 sets a peripheral region around a red-eye candidate region (e.g., the double-length region shown in FIG. 13A), and applies Sobel filtering processing to each pixel in the peripheral region. Then, the characteristic amount determining section 204 calculates an average value So(ave) of Sobel output values obtained from the Sobel filtering processing.

Considering a possibility that a sharp edge is present in the vicinity of a human eye, the characteristic amount determining section 204 compares the average value So(ave) to a threshold Th_FJ4_SobelPow. When the average value So(ave) is equal to or smaller than the threshold Th_FJ4_SobelPow (i.e., So(ave)≦Th_FJ4_SobelPow), the characteristic amount determining section 204 excludes the target red-eye candidate region from the candidate region list.

Furthermore, the characteristic amount determining section 204 sets a peripheral region around a red-eye candidate region (e.g., the triple-length region shown in FIG. 13B), and applies the Sobel filtering processing to each pixel in the peripheral region. The characteristic amount determining section 204 calculates a difference Ds between a maximum value and a minimum value of Sobel output values obtained from the Sobel filtering processing.

In general, both a sharp edge and a flat skin color region are present in the vicinity of a human eye. The difference Ds is a relatively large value. Accordingly, the characteristic amount determining section 204 compares the difference Ds to a threshold Th_FJ4_MaxMinDiff. When the difference Ds is equal to or less than the threshold Th_FJ4_MaxMinDiff (i.e., Ds≦Th_FJ4_MaxMinDiff), the characteristic amount determining section 204 excludes the target red-eye candidate region from the candidate region list.

Furthermore, the characteristic amount determining section 204 sets a peripheral region around a red-eye candidate region (e.g., the triple-length region shown in FIG. 13B), and applies the Sobel filtering processing to each pixel in the peripheral region. Then, the characteristic amount determining section 204 stores Sobel output values of respective pixels, as an edge image, in the array sobel[y][x] allocated in the RAM 103.

Next, the characteristic amount determining section 204 calculates a centroid position (Xw,Yx) of the edge image. The characteristic amount determining section 204 can obtain the centroid position (Xw, Yx) by the following formula (19).

$$(Xw, Yw) = (\Sigma x \cdot Sobel[y][x]/Sobel[y][x], \Sigma y \cdot Sobel[y][x]/Sobel[y][x]) \quad (19)$$

If a target red-eye candidate region is a human eye, the centroid position (Xw, Yx) is present in the vicinity of the center of an edge image. Accordingly, the characteristic amount determining section 204 determines whether the centroid position (Xw, Yx) is involved, for example, in the block 1301. When the centroid position (Xw, Yx) is included in the block 1301, the characteristic amount determining section 204 recognizes this region as a red-eye candidate region. When the centroid position (Xw, Yx) is not included in the block 1301, the characteristic amount determining section 204 excludes the target red-eye candidate region from the candidate region list.

Furthermore, the characteristic amount determining section 204 sets a quintuple-peripheral region around a red-eye candidate region (refer to FIG. 13C), and applies the Sobel filtering processing to each pixel of the peripheral region. The characteristic amount determining section 204 stores Sobel output values of respective pixels, as an edge image, in the array Sobel [y][x]. The array Sobel [y][x] is equivalent in size to the pixel number of the quintuple-peripheral region.

Figure 17:
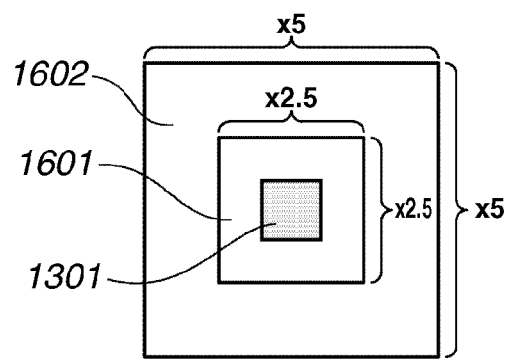
FIG. 17 illustrates an exemplary method for setting a peripheral region.

Next, the characteristic amount determining section 204 defines two regions shown in FIG. 17, i.e., a central region 1601 and an external region 1602, within the entire peripheral region including the block 1301. Then, in each region, the characteristic amount determining section 204 calculates an average value of Sobel output values stored in the array Sobel [y][x]. FIG. 17 shows the central region 1601 which is 2.5 times larger than the block 1301. However, the size of the central region 1601 is not limited to 2.5 times the size of the block 1301.

In the following description, $SPow^{in}$ represents an average of Sobel output values in the central region 1601 and $SPow^{out}$ represents an average of Sobel output values in the external region 1602. There is a tendency that, in the vicinity of a human eye, a sharp edge is present in the central region 1601 rather than in the external region 1602. Thus, the characteristic amount determining section 204 performs the following determination.

$$SPow^{in}/SPow^{out} > Th\_FJ4\_InOutRatio \quad (20)$$

When the formula (20) is satisfied, the characteristic amount determining section 204 determines that the target red-eye candidate region is a red eye region. If the formula (20) is not satisfied, the characteristic amount determining section 204 determines that the target red-eye candidate region is not a red eye region and excludes the target red-eye candidate region from the candidate region list.

As a modification of the above-described determination, the characteristic amount determining section 204 can compare each of $SPow^{in}$ and $SPow^{out}$ to an independent threshold.

Finally, the characteristic amount determining section 204 determines a red-eye candidate region accepted in all (or part) of the above-described determinations of characteristic amount groups 0 through 4 as a red eye region. The characteristic amount determining section 204 sends the candidate region list of finalized red eye regions to the correcting section 205.

Correcting Section 205

The correcting section 205 receives input image data including R, G and B components and the candidate region list of red eye regions obtained in the processing of the characteristic amount determining section 204.

Figure 18:
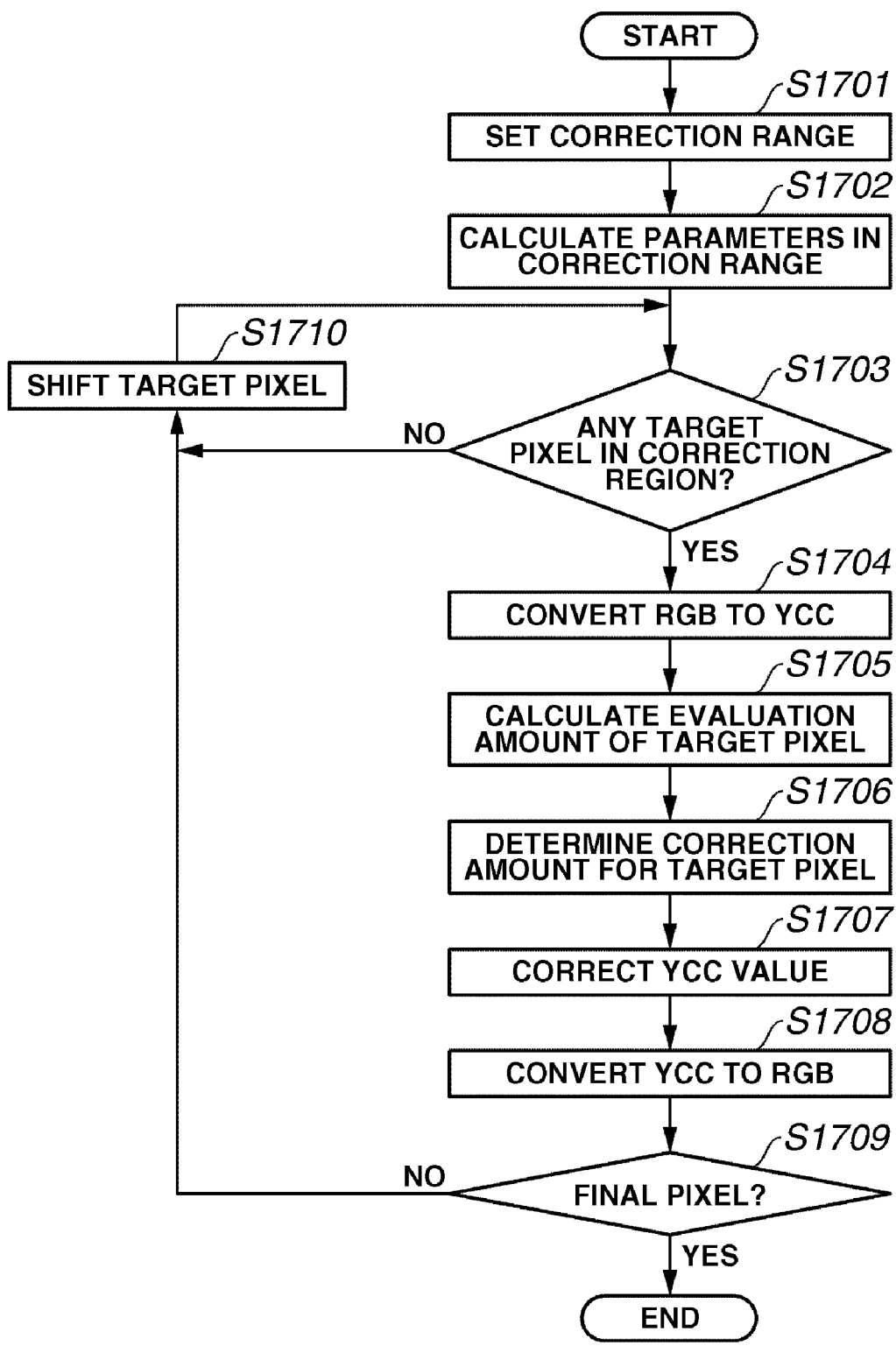
FIG. 18 is a flowchart showing exemplary correction processing for correcting one of plural red eye regions in a candidate region list.

FIG. 18 is a flowchart illustrating exemplary correction processing performed by the correcting section 205 that corrects one of plural red eye regions in the candidate region list. In other words, the correcting section 205 corrects the red eye regions in the candidate region list, one by one, according to the processing shown in FIG. 18.

Figure 19:
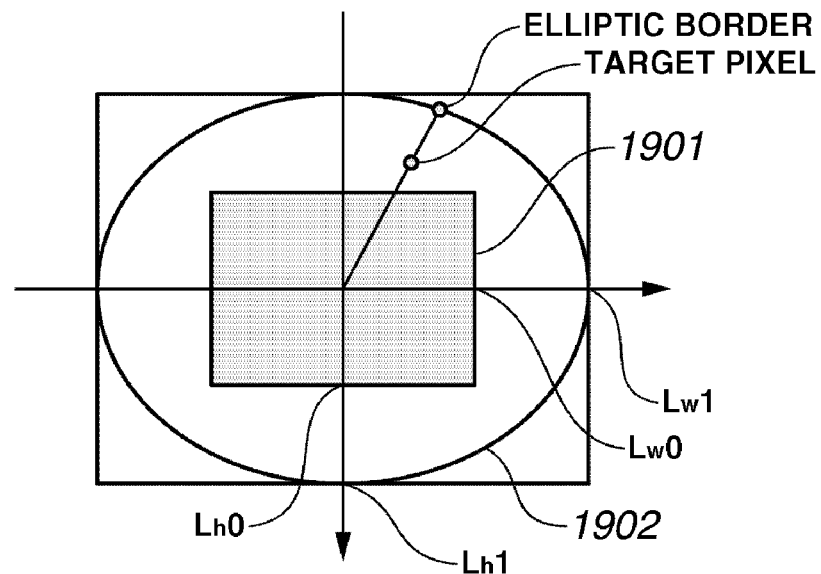
FIG. 19 illustrates an exemplary determination of a correction range.

First, the correcting section 205 determines a correction range for a target redeye region (step S1701). FIG. 19 illustrates an exemplary determination of the correction range, in which a central rectangular region is a red eye region 1901 included in the candidate region list.

The correcting section 205 sets an elliptic correction region 1902 having a major radius Lw1 and a minor radius Lh1 extending from a center of the red eye region 1901.

The correcting section 205 can calculate Lw1 and Lh1 according to the following formula (21).

$$Lw1 = Lw0 \times CPARAM\_AREARATIO$$

$$Lh1 = Lh0 \times CPARAM\_AREARATIO \quad (21)$$

where, Lw0 and Lh0 represent a half width and a half height of the red eye region 1901, and CPARAM_AREARATIO represents a parameter for determining the correction range.

Next, the correcting section 205 calculates required correction parameters in the correction region 1902 (step S1702). The parameters to be calculated are a maximum luminance value Ymax in the elliptic region and a maximum value Ermax of the evaluation amount Er defined by the formula (3).

Next, the correcting section 205 determines whether a target pixel is present in the elliptic correction region 1902 (step S1703). The correcting section 205 can perform the determination with the following formula (22) that can calculate an ellipse.

$$(x/Lw1)^2 + (y/Lh1)^2 \leq 1 \quad (22)$$

where, (x, y) represents the coordinates of the target pixel, and an origin of the coordinates is positioned at the center of the target red eye region.

When the coordinates (x, y) of the target pixel satisfy the formula (22), the correcting section 205 determines that the target pixel is present in the correction region 1902 and the processing flow proceeds to step S1704. When the target pixel is not present in the correction region 1902, the correcting section 205 shifts the target pixel to the next pixel (step S1710), and the processing flow then returns to step S1703. When the target pixel is present in the correction region 1902, the correcting section 205 converts R, G and B component values of the target pixel into YCC values of luminance and color difference components (step S1704). The correcting section 205 can use various conventionally known conversion methods.

Next, the correcting section 205 calculates an evaluation amount of the target pixel (step S1705). The evaluation amount is a parameter required when the correcting section 205 determines a correction amount in the next step S1706. More specifically, the evaluation amount includes the following three values:

(1) a ratio r/r0, where r represents the distance from the center of the red eye region 1901 to the target pixel and r0 represents the distance from the center to an ellipse border;

(2) a ratio Er/Ermax, where Er represents an evaluation amount of the target pixel and Ermax represents a maximum evaluation amount; and (3) a ratio Y/Ymax, where Y represents luminance of the target pixel and Ymax represents a maximum luminance value.

Next, based on the parameters obtained in step S1705, the correcting section 205 calculates a correction amount Vy of luminance Y and a correction amount Vc of color difference components Cr and Cb of the target pixel according to the following formula (23) (step S1706).

$$Vy=\{1-Rr^{Ty1}\}\cdot\{1-(1-Re)^{Ty2}\}\cdot\{1-RY^{Ty3}\} \quad Vc=\{1-Rr^{Tc1}\}\cdot\{1-(1-Re)^{Tc2}\} \quad (23)$$

where, Rr=r/r0, Re=Er/Ermax, and Ry=Y/Ymax.

The correction amounts Vy and Vc are both in the range of 0.0 to 1.0. The correction amounts Vy and Vc become larger when they approach 1.0. The correcting section 205 uses the above three parameters to determine the correction amount Vy of the luminance Y. When the target pixel is positioned far from the center of the correction region 1902, the correction amount Vy is small. Furthermore, when the evaluation amount Er of the target pixel is smaller than the maximum value Ermax, the correction amount Vy is small. When the luminance Y of the target pixel is close to the maximum value Ymax, the correction amount Vy is small.

Reducing the correction amount Vy of a brighter pixel is effective in preserving a highlight section (catch light) in an eye. On the other hand, the correction amount Vc of the color difference components Cr and Cb does not include the parameter relating to the luminance Y.

Figure 20:
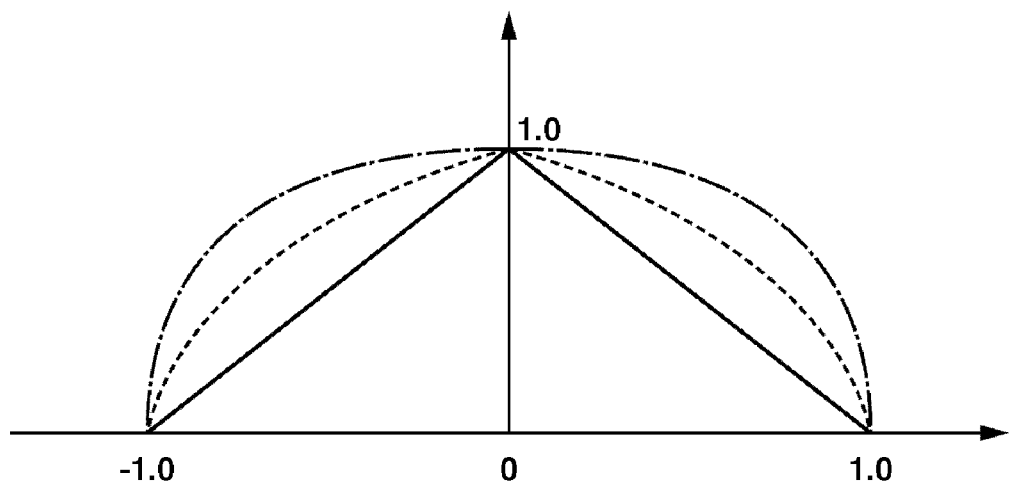
FIG. 20 illustrates an exemplary correction parameter setting method.

In the formula (23), parameters Ty1, Ty2, Ty3, Tc1, and Tc2 can be set appropriately so that each evaluation amount (i.e., a value in parentheses { } included in the formula (23)) can be applied as a straight line or curve of first-order (solid line), second-order (broken line), or third-order (alternate long and short dash line) as shown in FIG. 20.

Next, based on the correction amounts Vy and Vc, the correcting section 205 calculates corrected YCC values according to the following formula (24) (step S1707).

$$Y'=(1.0-Wy\cdot Vy)\cdot Y$$

$$C'=(1.0-Wc\cdot Vc)\cdot C \quad (24)$$

where, Y and C are uncorrected values and Y' and C' are corrected values, and Wy and Wc are weighting values in the range of 0.0 to 1.0.

The weighting values Wy and Wc are adjustable when the correct intensity is designated. For example, three (weak, middle, and strong) levels of correction intensity can be obtained by setting both of Wy and Wc to 0.3, 0.7, and 1.0, respectively.

When the new values of the luminance and the color difference component are determined, the correcting section 205 converts the YCC values into RGB values and overwrites the RGB values as corrected pixel values into a memory buffer for the input image, or stores the obtained RGB values into a predetermined address of a memory buffer storing an output image (step S1708).

Then, in step S1709, the correcting section 205 determines whether the target pixel is a final pixel corresponding to the target red eye region. When the target pixel is not a final pixel (i.e., NO in step S1709), the processing flow proceeds to step S1710 to shift the target pixel to the next pixel (step S1710) and repeats the above-described processing (steps S1703 through S1708). When the target pixel is a final pixel corresponding to the target red eye region (i.e., YES in step S1709), the correcting section 205 starts the correction processing for the next red eye region to accomplish the correction processing for remaining red eye regions recorded in the candidate region list.

According to the above-described method, the correcting section 205 inputs an image including R, G, and B components, converts the input image into luminance and color difference component values, corrects the converted values, and then returns the corrected values to R, G, and B components. However, another method can be used.

For example, the correcting section 205 can convert the R, G, and B components into luminosity (intensity) and saturation values, correct the converted values, and then return the corrected luminosity (intensity) and saturation values to R, G, and B components. A similar output result will be obtained.

The correcting section 205 uses, as parameters for determining the correction amount, the ratio Er/Ermax of the evaluation amount Er of the target pixel to the maximum evaluation amount Ermax in the correction region 1902. However, the correcting section 205 can use other parameters. For example, the correcting section 205 can use the ratio of a saturation of the target pixel to a maximum saturation in the correction region 1902 to determine the correction amount.

As described above, pixels constituting a red eye can be detected by using the evaluation amount Er which is defined as a relationship between R and G components without relying on the value relating to the saturation. Thus, red eyes of a person having dark (deep) pigments can be accurately extracted.

Furthermore, a red circle region can be speedily extracted by applying the borderline tracing method to a binarized image corresponding to a red-eye candidate pixel. The calculation amount can be greatly reduced.

Furthermore, various characteristic amounts of a red eye can be obtained from a red circle region, and a red eye region can be accurately identified by evaluating the calculated characteristic amounts.

Furthermore, considering the effects of individual characteristic amount determinations and the calculation amount in the calculation of characteristic amounts, plural characteristic amount determinations can be carried out in an optimized order so that unnecessary red eye region candidates can be effectively excluded. Accordingly, detection of a red eye region can be speedily realized with a minimized processing amount.

Second Exemplary Embodiment

The image processing according to a second exemplary embodiment of the present invention will be described below. In the second exemplary embodiment, the arrangement similar to that of the first exemplary embodiment will be denoted with the same reference numerals and will not be described below in detail.

According to the adaptive binarization processing described in the first exemplary embodiment, a predetermined size of window 403 (refer to FIG. 4) is set at the left side of a target pixel (i.e., a forward region in the main scanning direction), an average value Er(ave) of evaluation amounts of pixels within the window 403 is calculated, and the determination is made to determine whether the target pixel constitutes a red region with a threshold of average value Er(ave).

Figures 21A, 21B:
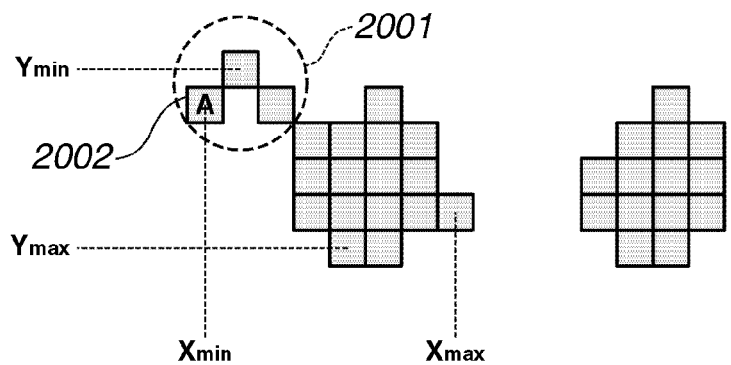
FIGS. 21A and 21B illustrate a problem to be solved in a second exemplary embodiment.

Such a method requires a small number of pixels to be referred to so as to calculate a threshold. The processing can be sped up. However, because the window 403 is not set at the right side of the target pixel, the reliability of binarization result is dependent on a processing direction. For example, if the adaptive binarization processing is applied to the image shown in FIG. 5A, a borderline of an eye indicated by a reference numeral 2001 may be erroneously extracted as pixels constituting a red region, in addition to a pupil region (i.e., a red eye region), as shown in FIG. 21A. The reason is as follows.

According to the first exemplary embodiment, a threshold for binarizing a target pixel 2002 is an average value Er (ave) of evaluation amounts of pixels within the window set at the left side of the target pixel 2002. The binarization processing is performed based on a comparison result between an evaluation amount Er of the target pixel 2002 and the average value Er(ave) (refer to formula (6)).

According to the example shown in FIG. 21A, the window is in a skin color region positioned at the left side of a pupil to be extracted. For example, the skin color region of a person having bright pigments has pixel values of (R, G, B)=(151, 135, 110). In this case, the evaluation amount Er calculated according to the formula (3) is 11%, which is a relatively small value. On the other hand, the target pixel 2002 constituting a borderline of an eye has a value of, for example, (R, G, B)=(77, 50, 29).

The luminance of the eye-borderline region is low compared with that of the skin color region. The evaluation amount Er calculated according to the formula (3) is 35%. As apparent from the above calculation results, the evaluation amount Er of an eye-borderline region is larger than the evaluation amount Er of a skin color region in the window.

According to the adaptive binarization processing described in the first exemplary embodiment, although it depends on the setting of the parameter Margin_RGB, the target pixel 2002 will be erroneously extracted as a pixel constituting a red region. As a result, a red region defined by coordinates (xmin, ymin) and (xmax, ymax) shown in FIG. 21A is extracted.

If the extraction result is entered into the red circle region extracting section 203, the red circle region extracting section 203 will apply the extraction processing to a region larger than an inherent red circle region. The extraction result will not be reliable and the extraction time will increase.

If the same size of window is set at the right side of the target pixel 2002, the window will include many pixels constituting a borderline of an eye and a pupil region of a red-eye in addition to the pixels of a skin color region. Therefore, an average value Er(ave) of evaluation amounts in the window positioned at the right side of the target pixel 2002 will increase. In other words, the target pixel 2002 cannot have an extremely large evaluation amount Er compared with those of the pixels in the window positioned at its right side. As a result, the target pixel 2002 will not be erroneously detected as a pixel constituting a red region.

In view of the foregoing, the second exemplary embodiment describes adaptive binarization processing executed by the red region extracting section 202 which sets two windows at right and left sides of a target pixel. In the adaptive binarization processing according to the second exemplary embodiment, the red region extracting section 202 sets a window 403 at the left side of a target pixel 402 as shown in FIG. 22A, and then binarizes the target pixel 402 according to a method similar to that described in the first exemplary embodiment.

Figure 22A:
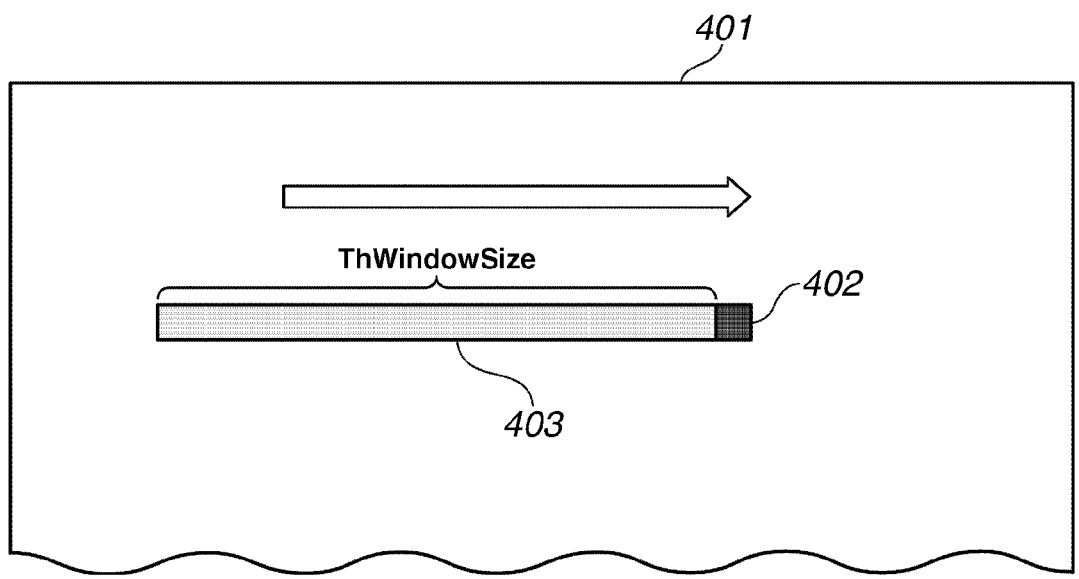
FIG. 22A illustrates exemplary adaptive binarization processing in accordance with the second exemplary embodiment.

Then, the red region extracting section 202 shifts the target pixel 402 from the left edge to the right edge as indicated by an arrow in FIG. 22A, and stores the binarization result in a binarization image buffer allocated in the RAM 103.

When the target pixel 402 reaches the right edge, the red region extracting section 202 terminates the binarization processing using the target pixel 402 shifting from the left to the right.

Figure 22B:
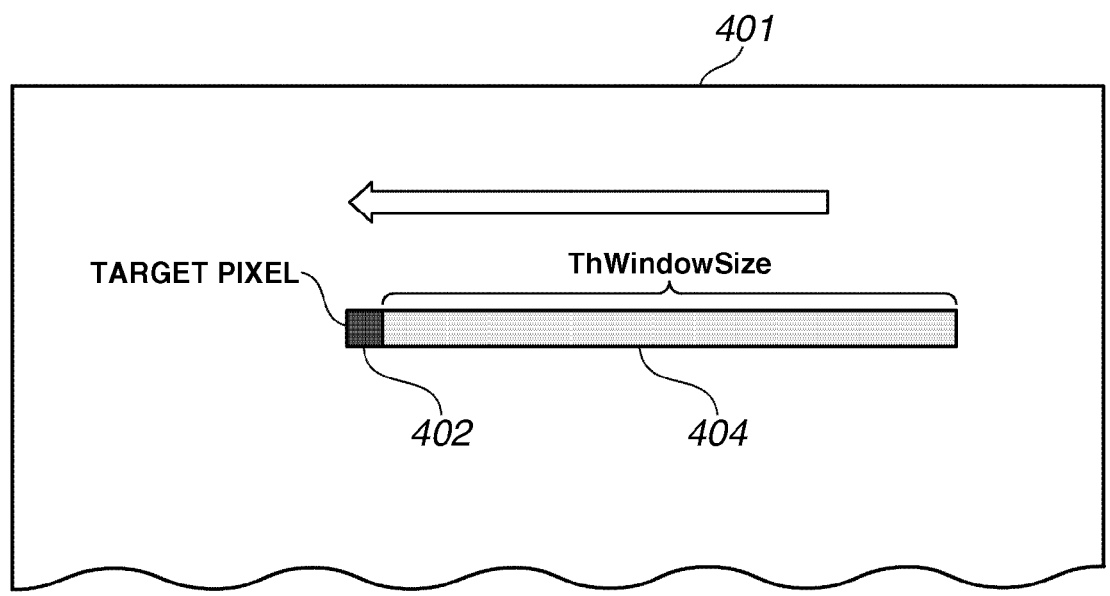
FIG. 22B illustrates exemplary adaptive binarization processing in accordance with the second exemplary embodiment.

Then, the red region extracting section 202 performs binarization processing in the reversed direction with the target pixel 402 shifting from the right to the left along the same line as shown in FIG. 22B.

To this end, the red region extracting section 202 sets a window 404 for setting a binarization threshold at the right side of the target pixel 402.

In the above-described bidirectional binarization, the red region extracting section 202 recognizes a pixel having a binarization result of '1' as a pixel constituting a red region and stores the pixel in the binarization image buffer.

FIG. 21B shows an example of pixels constituting a red region that can be obtained through the bidirectional adaptive binarization processing. Compared with the result obtainable from the unidirectional adaptive binarization processing (refer to FIG. 21A), the pixels constituting an eye-borderline region can be removed and a red region can be accurately extracted.

As described above, when a red region is extracted by the bidirectional adaptive binarization processing, the window for calculating a binarization threshold is set at right and left sides of a target pixel. The pixels constituting a red region can be accurately extracted.

Third Exemplary Embodiment

Image processing according to a third exemplary embodiment of the present invention will be described next. In the third exemplary embodiment, the arrangement similar to that of the first or second exemplary embodiment will be denoted with the same reference numerals and will not be described below in detail. According to the first and second exemplary embodiments, the adaptive binarization processing is performed based on the evaluation amount Er defined in the formula (3) to extract the pixels constituting a red region.

Figure 23:
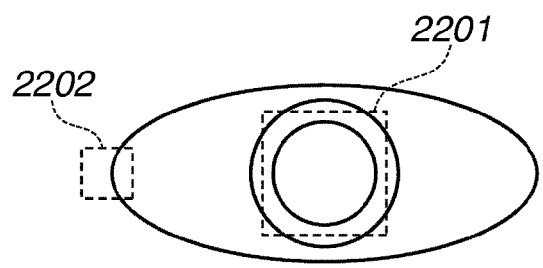
FIG. 23 illustrates a problem to be solved in a third exemplary embodiment.

According to this method, pixels constituting an eye head (or eye tail) portion 2202 (shown in FIG. 23) may be erroneously detected as pixels constituting a pupil region 2201. The eye head (or eye tail) portion 2202 includes many "dark red" pixels having pixel values of, for example, (R, G, B)=(81, 41, 31). The evaluation amount Er of these pixels is 49%, which is a relatively large value.

Therefore, according to the adaptive binarization processing according to the first or second exemplary embodiment, the eye head (or eye tail) portion 2202 will be detected as an assembly of pixels having a significant size. Furthermore, in luminosity (intensity), hue, and saturation, an edge and a peripheral region of the assembly have characteristics similar to those of an eye.

Therefore, the red circle region determining section 203 and the characteristic amount determining section 204 may erroneously recognize the eye head (or eye tail) portion 2202 as a red eye region that can satisfy all determinations. In view of the above, the third exemplary embodiment provides an arrangement capable of solving the above problems.

Figure 24:
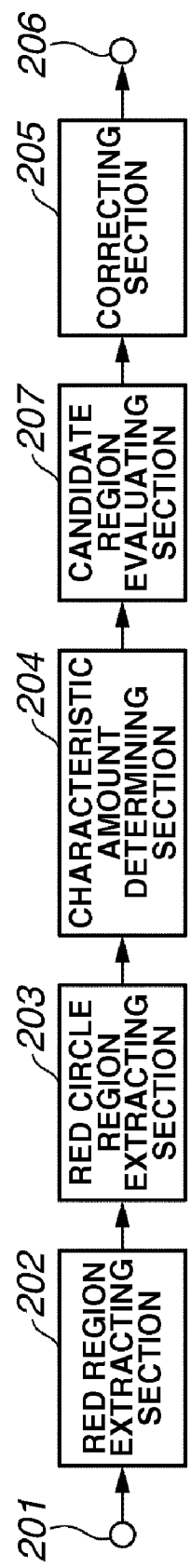
FIG. 24 is a functional block diagram illustrating automatic red-eye correction processing in accordance with the third exemplary embodiment.

FIG. 24 is a functional block diagram illustrating automatic red-eye correction processing according to the third exemplary embodiment, which the CPU 101 can execute. Compared with the first exemplary embodiment, a candidate region evaluating section 207 is newly added. The candidate region evaluating section 207 can evaluate a relative position and an area of each red-eye candidate region, with reference to the candidate region list generated from the characteristic amount determining section 204, to rearrange red-eye candidate regions.

Figure 25:
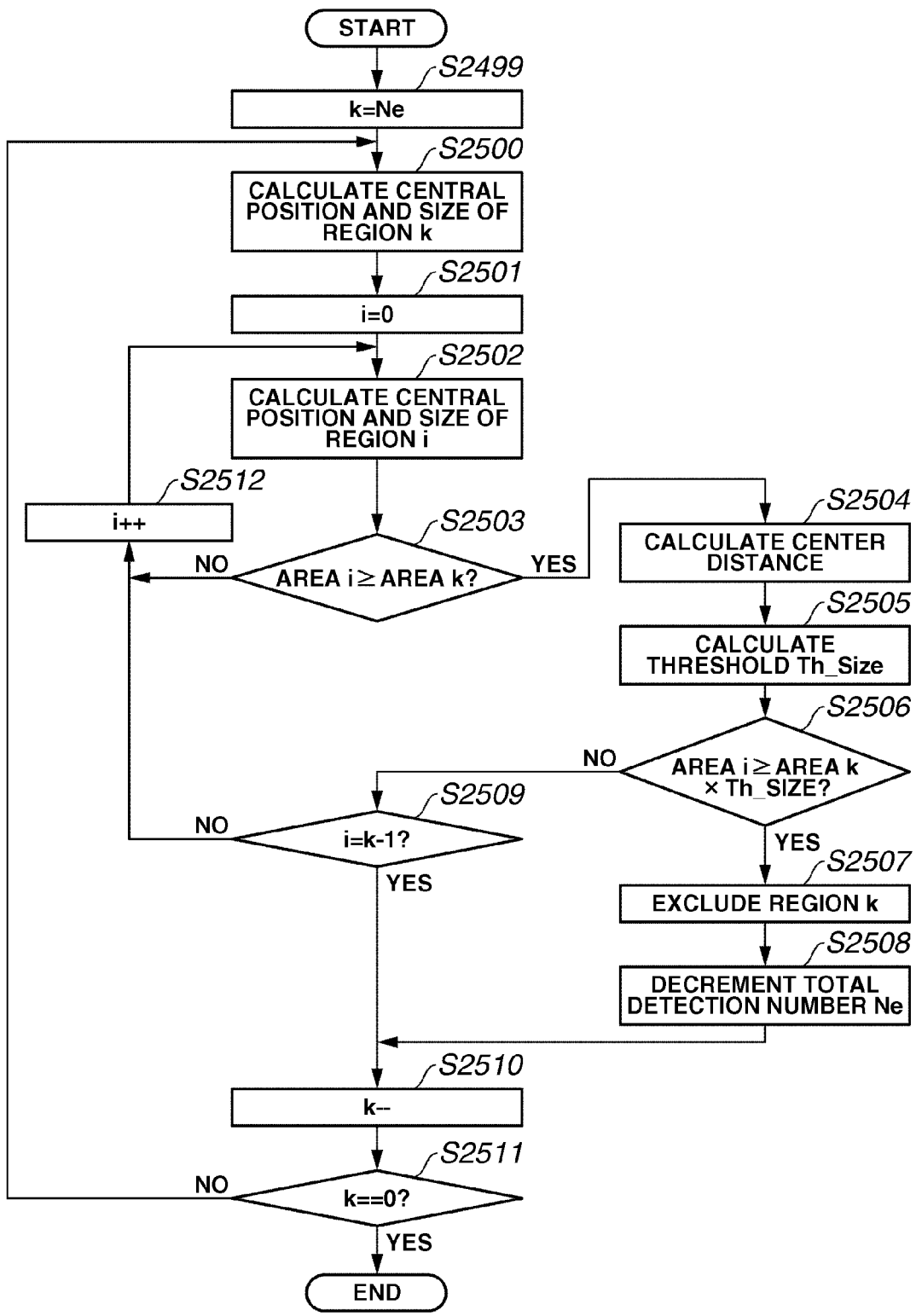
FIG. 25 is a flowchart showing exemplary processing performed by a candidate region evaluating section.

More specifically, the candidate region evaluating section 207 can exclude an inappropriate red-eye candidate region from the candidate region list as a result of evaluation. FIG. 25 is a flowchart illustrating exemplary processing performed by the candidate region evaluating section 207. It is now assumed that a total of k (i.e., 0th to (k−1)th) regions can be extracted as red-eye candidate regions through the processing of the characteristic amount determining section 204 (total detection number Ne=k).

First, the candidate region evaluating section 207 sets the total detection number Ne to a counter k (step S2499). Then, the candidate region evaluating section 207 calculates the central position and the size of a k-th red-eye candidate region (hereinafter, referred to as a "region k") (step S2500). The candidate region evaluating section 207 can obtain, as a representative size, the length of a shorter side of a red-eye candidate region extracted as a rectangular region. Next, the candidate region evaluating section 207 initializes the counter i to 0 (step S2501). Then, the candidate region evaluating section 207 calculates the central position and the size of another red-eye candidate region stored in the candidate region list (hereinafter, referred to as a "region i") (step S2502). Then, the candidate region evaluating section 207 compares an area of the region k (hereinafter, referred to as an "area k") with an area of the region i (hereinafter, referred to as an "area i") (step S2503).

When the area i is smaller than the area k (i.e., NO in step S2503), the candidate region evaluating section 207 increments the counter i by 1 (step S2512). The processing flow then returns to step S2502. When the area i is not smaller than the area k, i.e., when a red-eye candidate region having an area large than that of the region k is present (i.e., YES in step S2503), the candidate region evaluating section 207 calculates a center distance "Size" between both regions k and i shown in FIG. 26 (step S2504). Then, based on the center distance "Size", the candidate region evaluating section 207 calculates a threshold Th_Size required for evaluation of size and execution of the determination (step S2505).

FIG. 27 illustrates an exemplary relationship between the center distance "Size" and the threshold Th_Size, wherein an abscissa represents the center distance and an ordinate represents the threshold Th_Size. Furthermore, parameters Sa, Sb, La, and Lb can be set to appropriate values, such as La=3.0, Lb=5.0, Sa=1.0, and Sb=2.0. According to the above parameter setting, when the center distance "Size" is not greater than three times the size of the region k (i.e., the shorter side length), the threshold Th_Size is 1.0.

Furthermore, when the center distance "Size" is within the range from three times to five times the size of the region k, the threshold Th_Size can be determined as a value on a straight line shown in FIG. 27. Furthermore, when the center distance "Size" exceeds five times the size of the region k, the candidate region evaluating section 207 skips the determination processing.

Next, the candidate region evaluating section 207 compares the area i with an area k×Th_Size. When the area i is not less than the area k×Th_Size, i.e., when a red-eye candidate region larger than the region k is present in the vicinity of the region k (YES in step S2506), the candidate region evaluating section 207 determines that the region k is not a red eye region and excludes the region k from the candidate region list (step S2507). Then, the candidate region evaluating section 207 decrements the total detection number Ne (step S2508). The processing flow then proceeds to step S2510.

When the area i is less than the area k×Th_Size (i.e., NO in step S2506), the processing flow proceeds to step S2509 to determine whether i is equal to k−1. When i is less than k−1 (i.e., NO in step S2509), the candidate region evaluating section 207 increments the counter i by 1 (step S2512), and the processing flow returns to step S2502. When i is equal to k−1 (i.e., YES in step S2509), the processing flow proceeds to step S2510.

In step S2510, the candidate region evaluating section 207 decrements the counter k by 1. Then, the candidate region evaluating section 207 determines whether k is equal to 0 (step S2511). When k is greater that 0 (i.e., NO in step S2511), the processing flow returns to step S2500. When k is equal to 0 (i.e., YES in step S2511), the candidate region evaluating section 207 terminates the processing.

Through the above-described determination processing, the candidate region evaluating section 207 can remove unnecessary red-eye candidate regions from the candidate region list. As described above, when a smaller red-eye candidate region is present in the vicinity of a red-eye candidate region, the smaller red-eye candidate region can be excluded from the candidate region list. Thus, the above-described problems can be solved.

Fourth Exemplary Embodiment

Image processing according to a fourth exemplary embodiment of the present invention is described next. In the fourth exemplary embodiment, the arrangement similar to that of the first, second, or third exemplary embodiment will be denoted with the same reference numerals and will not be described below in detail. According to the adaptive binarization processing described in the first exemplary embodiment, a red eye region may be divided into two regions by the highlight of a red eye.

FIG. 28A illustrates an exemplary enlarged red eye which includes an iris region 2701, a red pupil region 2702, and a highlight (white) region 2703 generated by flash. As is well known, the red-eye phenomenon is caused by flash. In many cases, a highlight region (i.e., a reflection of flash light) is present in the pupil region 2702 of photographed image data. This is also referred to as a catch light.

In general, a highlight region is a micro point in the pupil that has no adverse influence in the red-eye detection processing. However, depending on photographing conditions, a highlight region may have a large size comparable with a pupil region or may be a thin and long highlight region 2703 as shown in FIG. 28A.

If the adaptive binarization processing according to the first exemplary embodiment is applied to such image data, an evaluation amount Er of the highlight region 2703 will be an extremely small value and accordingly the highlight region 2703 cannot be recognized as part of a red region. Thus, as shown in FIG. 28B, a pupil region is divided into two regions 2704 and 2705 in a binarized image. If the succeeding processing is applied to the divided regions, the pupil region 2702 will not be recognized as a red eye region. To solve this problem, the fourth exemplary embodiment provides processing for connecting neighboring red circle regions.

Figure 29:
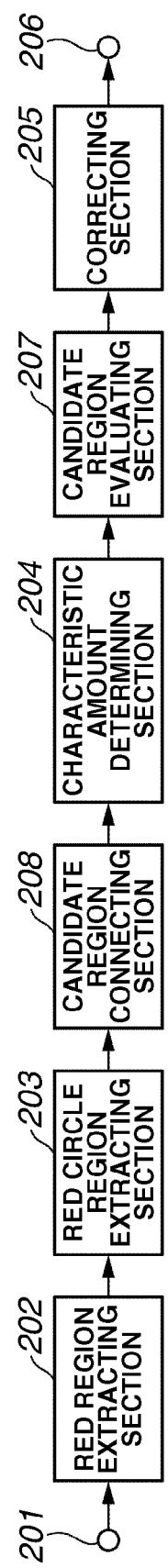
FIG. 29 is a functional block diagram showing illustrating red-eye correction processing in accordance with the fourth exemplary embodiment.

FIG. 29 is a functional block diagram illustrating automatic red-eye correction processing in accordance with the fourth exemplary embodiment, which the CPU 101 can execute. Compared with the third exemplary embodiment, a candidate region connecting section 208 is newly added.

The candidate region connecting section 208 can determine whether two neighboring red circle regions should be connected as a single red circle region, based on upper left and lower right coordinates of red circle regions extracted by the red circle region extracting section 203 and stored in the candidate region list.

FIG. 31 shows an example of the candidate region list, in which four red circle regions are recorded, although practical number of red circle regions will rise up to several tens to several thousands.

Figure 30:
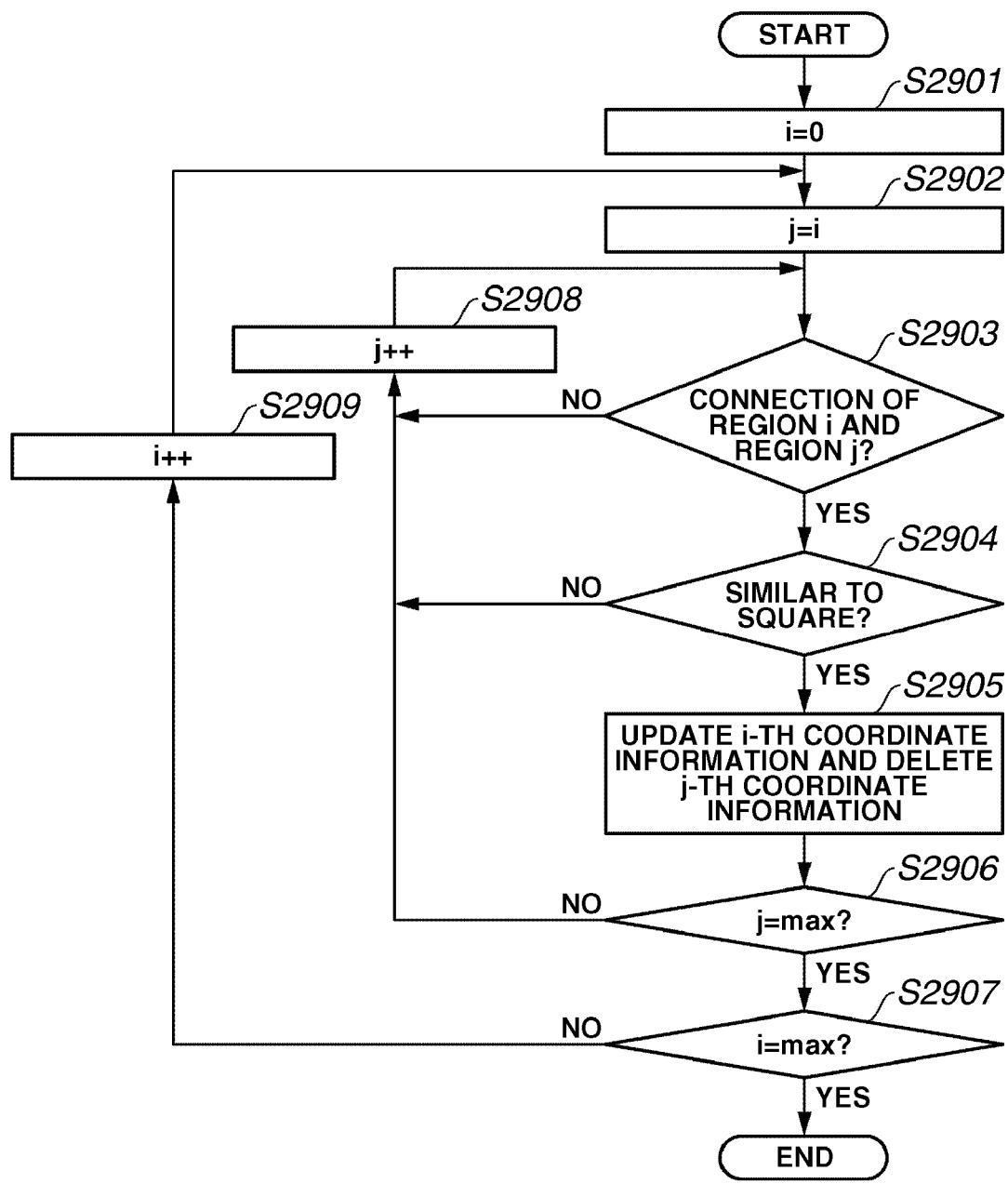
FIG. 30 is a flowchart illustrating exemplary processing performed by a candidate region connecting section.

FIG. 30 is a flowchart illustrating exemplary processing performed by the candidate region connecting section 208. First, the candidate region connecting section 208 initializes the counter i to 0 (step S2901) and also initializes the counter j to i (step S2902). Then, the candidate region connecting section 208 determines whether i-th and j-th red circle regions recorded in the candidate region list (hereinafter, referred to as a "region i" and a "region j") should be connected (step S2903).

More specifically, as shown in FIG. 32A, the candidate region connecting section 208 sets a rectangular region containing the region i having a width Wi and a height Hi (units: pixel number) and the region j having a width Wj and a height Hj. The candidate region connecting section 208 calculates a width Wij and a height Hij of the rectangular region. Next, with the following formula (25), the candidate region connecting section 208 determines whether the region i and the region j are adjacent to each other and are similar in size.

$$(Wi \cdot Hi + Wj \cdot Hj)/(Wij \cdot Hij) > Th\_J \quad (25)$$

where, $0 < \text{threshold Th\_J} \leq 1.0$.

Namely, the candidate region connecting section 208 calculates a sum of an area of the region i and an area of the region j, and calculates a ratio of the obtained sum to an area of the rectangular region containing two regions i and j. When the ratio is greater than the threshold Th_J, both regions i and j are adjacent to each other and are similar in size. If the region i and the region j are in a positional relationship shown in FIG. 32B, the ratio calculated by the formula (25) is small and accordingly the candidate region connecting section 208 determines that two regions i and j should not be connected.

When the determination result of step S2903 is NO (i.e., when two regions i and j should not be connected), the candidate region connecting section 208 increments the counter j by 1 (step S2908) and the processing flow returns to step S2903. When the determination result of step S2903 is YES (i.e., when two regions i and j should be connected), the candidate region connecting section 208 determines whether a connected region is similar to a square compared with unconnected regions (step S2904). More specifically, the candidate region connecting section 208 can use the following formula (26) for the determination of step S2904.

$$\min(Wij, Hij)/\max(Wij, Hij) > \max\{\min(Wi, Hi)/\max(Wi, Hi), \min(Wj, Hj)/\max(Wj, Hj)\} \quad (26)$$

According to the formula (26), an aspect ratio (not greater than 1.0) of the rectangular region containing the regions i and j is compared with a large value between an aspect ratio of the region i and an aspect ratio of the region j. When the left side is greater than the right side in the formula (26), it can be determined that the rectangular region containing the regions i and j is similar to a square. When the formula (26) is satisfied, a connected rectangular region is similar to a square and accordingly a red circle region has a circular shape.

When the formula (26) is not satisfied, the candidate region connecting section 208 increments the counter j by 1 (step S2908) and the processing flow returns to the step S2903. When the formula (26) is satisfied, the candidate region connecting section 208 replaces the i-th coordinate information in the candidate region list with the coordinates of a rectangular region containing the regions i and j, and deletes the j-th positional information from the candidate region list (step S2905).

Next, the candidate region connecting section 208 determines whether the counter j has reached a maximum value corresponding to the end of the list (step S2906).

When the counter j has not yet reached the maximum value (i.e., NO in step S2906), the candidate region connecting section 208 increments the counter j by 1 (step S2908) and the processing returns to the step S2903. When the counter j has reached the maximum value (i.e., YES in step S2906), the processing flow proceeds to step S2907 to determine whether the counter i has reached a maximum value corresponding to the end of the list.

When the counter i has not yet reached the maximum value (i.e., NO in step S2907), the candidate region connecting section 208 increments the counter i by 1 (step S2909) and the processing flow returns to the step S2902. When the counter i has reached the maximum value (i.e., YES in step S2907), the candidate region connecting section 208 terminates the processing.

Through the above determination processing, the candidate region connecting section 208 can connect two red circle regions separated by a highlight region and recorded in the candidate region list. In this manner, when a red circle region is present in the vicinity of a similar red circle candidate, the candidate region connecting section 208 determines whether connection of two regions can be recognized as a red eye region (i.e., determines whether a circumscribed rectangle is similar to a square).

Through the above-described processing, the candidate region connecting section 208 can properly reconstruct a red eye region by connecting two neighboring red circle regions divided by a highlight region produced in a pupil region.

Fifth Exemplary Embodiment

Image processing according to a fifth exemplary embodiment of the present invention is described next. In the fifth exemplary embodiment, the arrangement similar to that of the first, second, third, or fourth exemplary embodiment will be denoted with the same reference numerals and will not be described below in detail.

The fifth exemplary embodiment provides a method for realizing the image processing described in each of the first through fourth exemplary embodiments, with a CPU having a limited throughput and a memory (e.g., RAM) having a smaller storage capacity. For example, copying machines, printers, digital cameras, scanners, and multifunction peripherals have an image input/output device including an image processing section. These electronic devices have a usable work memory of several hundreds kB to several MB. Meanwhile, due to high resolution, the photographing ability of advanced digital cameras exceeds 10 mega pixels.

To perform the processing for detecting a red eye region from such a highly accurate image with a limited capacity of a work memory, it is effective to reduce the resolution of an input image. For example, an input image of 8 mega pixels can be reduced to an image of 2 mega pixels (i.e., to a ¼ level in the resolution) by sub-sampling it at the intervals of one pixel in both horizontal and vertical directions. In this case, the work memory capacity required for storing an image can be reduced to a ¼ level.

However, even if the input image can be reduced to an image of 2 mega pixels, a work memory of approximately 6 MB will be required to store the reduced image of 2 mega pixels, in the case of RGB 24 bits. A personal computer or a work station equipped with a large capacity RAM can provide a sufficient storage capacity. However, to provide a required storage capacity (i.e., a work memory of approximately 6 MB), the above-described electronic devices must manage the use of a limited work memory capacity.

In view of the foregoing, the fifth exemplary embodiment provides a method including the steps of reducing an input image, dividing a reduced image into plural bands, and successively extracting a red eye region in increments of one band.

Figure 33:
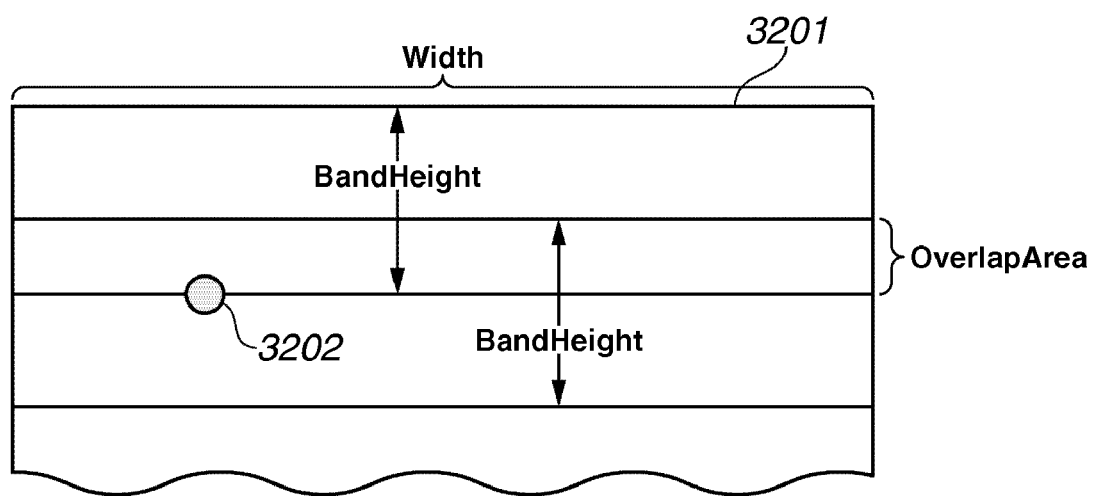
FIG. 33 illustrates exemplary divided bands in accordance with a fifth exemplary embodiment.

Furthermore, in the fifth exemplary embodiment, an overlap region is provided when the image is divided into plural bands so that a red eye region existing on or near a border of two bands can be surely detected, as shown in FIG. 33. In FIG. 33, reference numeral 3201 represents a reduced image of an input image and BandHeight represents a line number constituting one band. The extraction processing of a red eye region is applied to an image area of Width×BandHeight (units: pixel number).

Furthermore, the band division according to the fifth exemplary embodiment provides an overlap region, having a line number of OverlapArea, between two successive bands of an image to be processed. The above band division enables surely extracting a red eye region 3202 existing on a band border.

Figure 34:
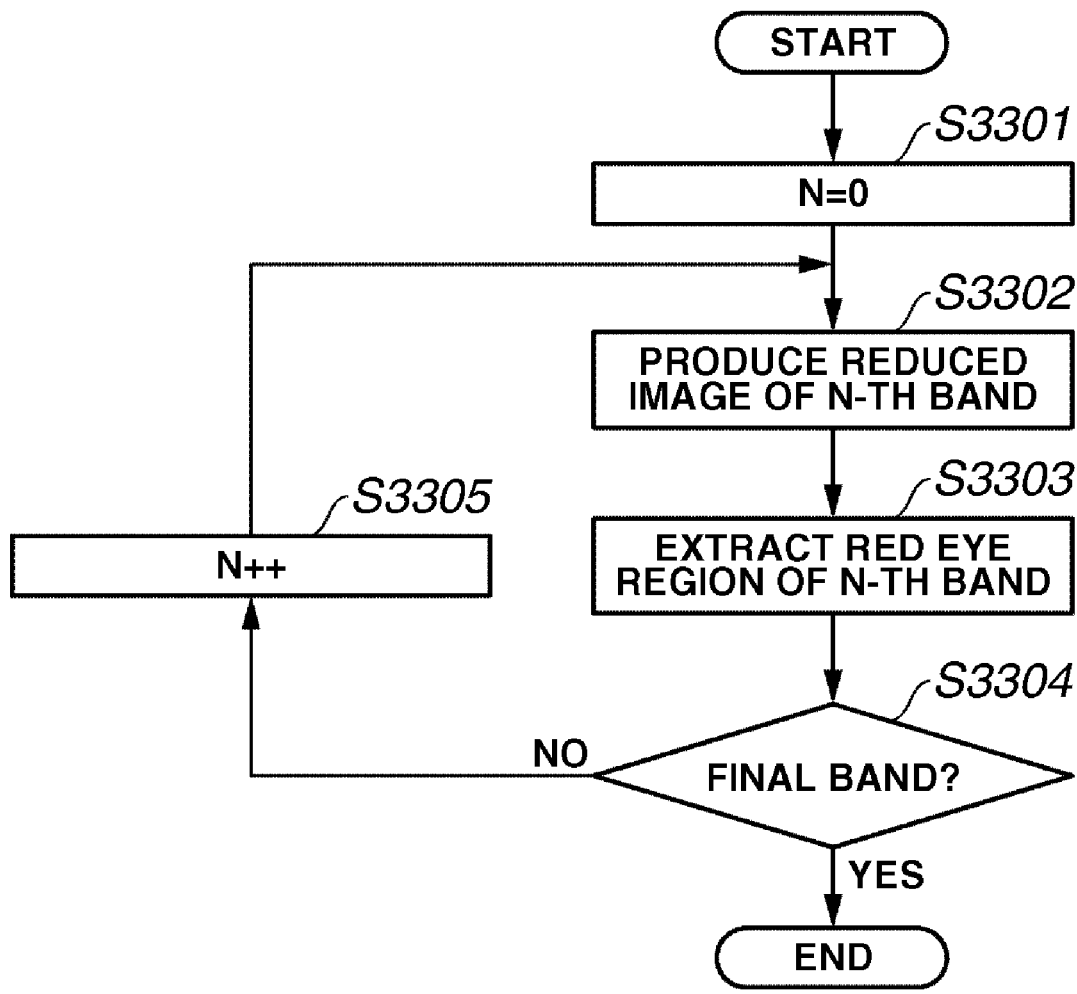
FIG. 34 is a flowchart illustrating exemplary processing for extracting a red eye region in accordance with the fifth exemplary embodiment.

FIG. 34 is a flowchart illustrating exemplary processing for extracting a red eye region in accordance with the fifth exemplary embodiment, which a CPU in an image input/output device can execute. First, the CPU initializes a counter N to 0 (step S3301), and then generates a reduced image of an N-th band (step S3302). The CPU can generate a reduced image by a simple thinning method. For example, a memory (e.g., a flash memory or a hard disk installed in a device, or a memory card externally connected) of an image input/output device can store an image of 8 mega pixels.

In step S3302, the CPU accesses image data in the memory. When the memory stores the image data of JPEG format, the CPU decodes an initial MCU (i.e., minimum coding unit) block and stores the decoded image data in a predetermined region of a work memory. The MCU block has a size of, for example, 16×8 pixels. Next, the CPU generates image data of 8×4 pixels by sub-sampling the decoded image data, for example, at intervals of one pixel, and stores the generated image data in an image storing region (allocated for extracted red eye regions) in the work memory. The CPU repeats the above processing until the image storing region (allocated for extracted red eye regions) is filled with the image corresponding to the BandHeight line number. Through the above processing, the CPU can obtain a band image resulting from the reduction of an image of 8 mega pixels into an image of 2 mega pixels.

Besides the above-described thinning method, the CPU can use various methods, such as a nearest interpolation method or a linear reduction method, for reducing an image. With the above-described processing, the CPU extracts a red eye region of an N-th band, when an N-th band image is obtained from the reduced image (step S3303).

Figure 35:
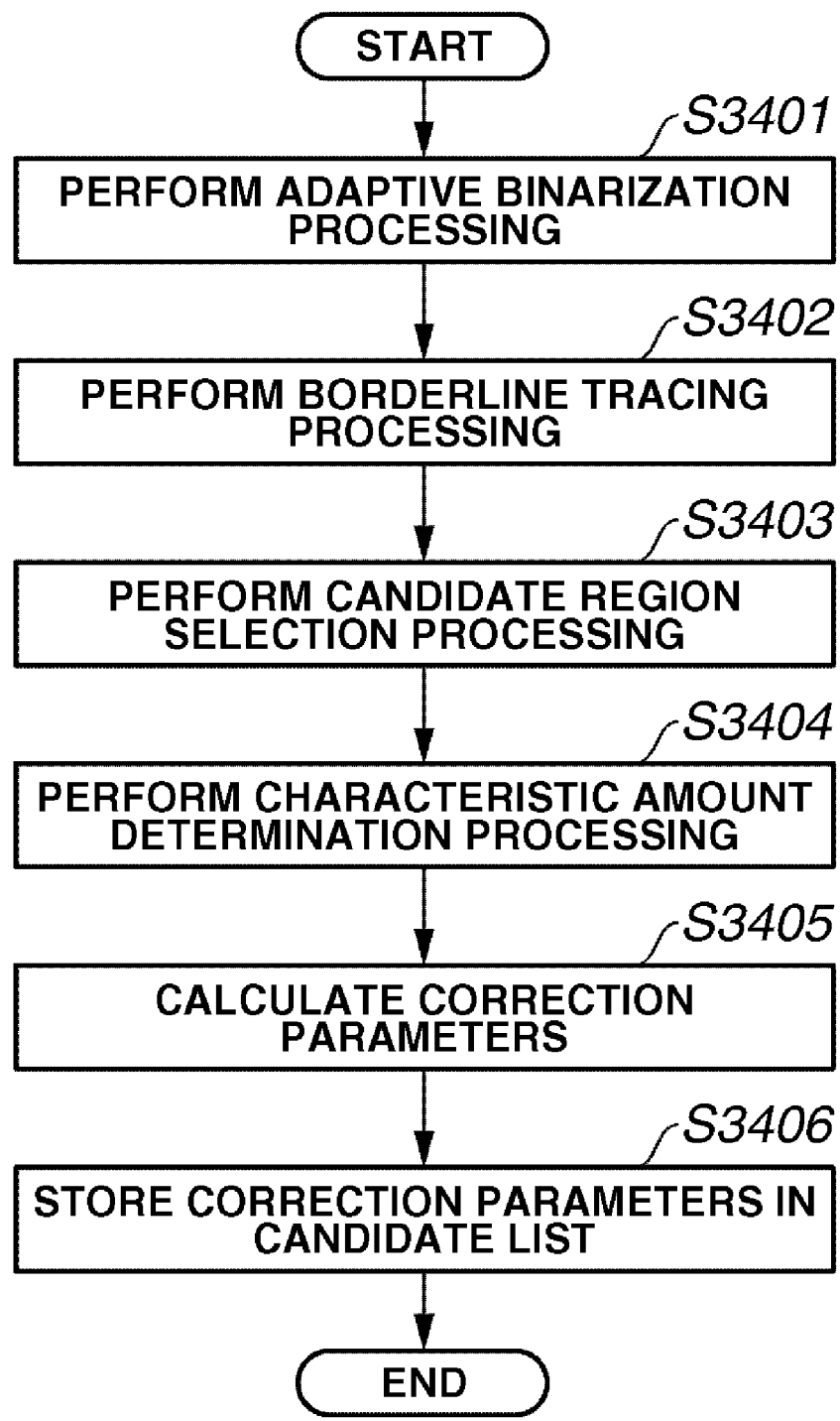
FIG. 35 is a flowchart illustrating exemplary processing for extracting a red eye region in an N-th band.

FIG. 35 is a flowchart illustrating exemplary processing of the CPU that can extract a red eye region of the N-th band (step S3303). First, the CPU applies the adaptive binarization processing described in the above-described exemplary embodiments to the reduced image data (step S3401). The CPU stores a processing result (i.e., a binarized image of a red region) in a storing region allocated separately from a storing region of the reduced image.

In this case, because OverlapArea represents an overlap region provided on the reduced image, the processing of the OverlapArea region is already accomplished in the previous processing for the image data of (N−1)th band. Accordingly, when N>0, the CPU can skip the processing of the OverlapArea region and can reuse the processing result obtained in the processing of the (N−1)th band image, so that the processing speed can be increased.

Next, the CPU applies the borderline tracing processing described in the above-described exemplary embodiment to the binarization result (i.e., a red region) to extract a red circle region from the band image (refer to step S3402).

Figure 36:
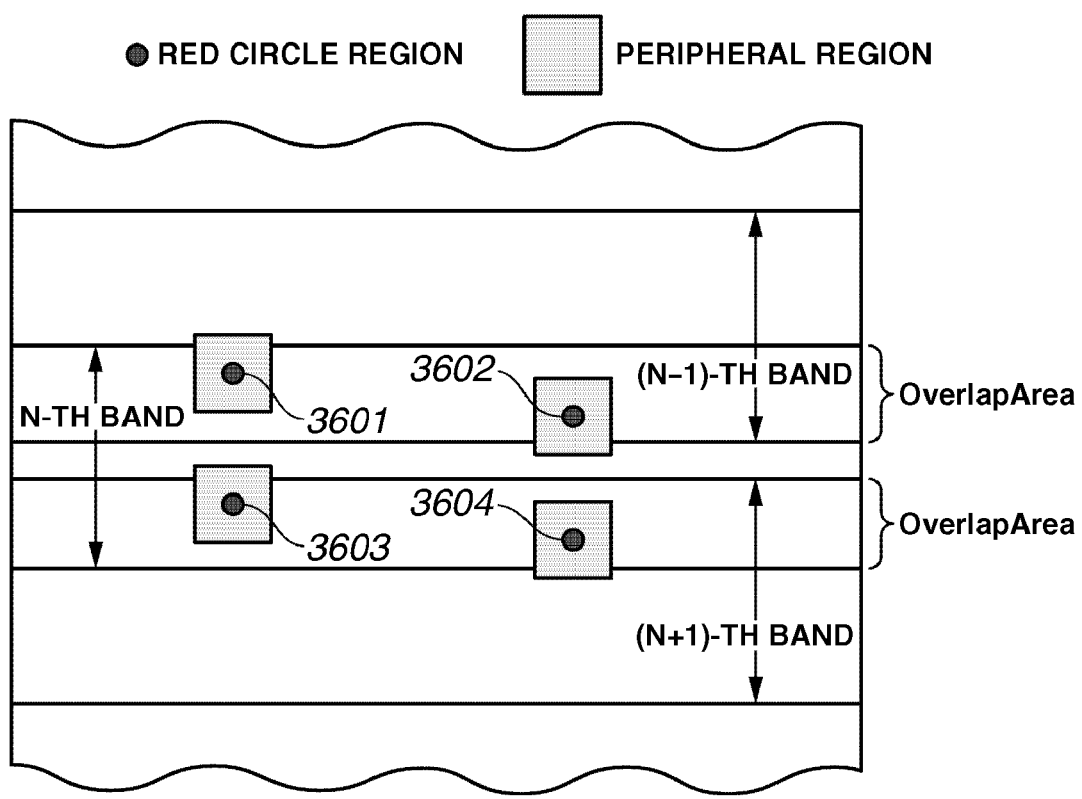
FIG. 36 illustrates four red circle regions positioned in OverlapArea regions of (N−1)th, N-th, and (N+1)th bands.

Next, the CPU performs candidate region selection processing for selecting a red circle region, to which the CPU applies characteristic amount determination processing, from plural extracted red circle regions (step S3403). FIG. 36 is an exemplary illustration of four red circle regions positioned in the OverlapArea regions of (N−1)th, N-th and (N+1)th bands. For example, a red circle region 3603 is present not only in the N-th band but also in the (N+1)th band. When the CPU performs the characteristic amount determination for both the N-th band and the (N+1)th band, the CPU will be required to process the same red circle region twice if it is positioned in the OverlapArea region. This is not efficient.

Hence, it is preferable that the CPU determines whether the characteristic amount determination for the red circle region 3603 should be performed in the processing of the N-th band or in the processing of the (N+1)th band. If the characteristic amount determination is performed in the processing of the (N+1)th band, a peripheral region of a red circle region 3601 will be cut at the upper end.

On the other hand, if the characteristic amount determination is performed in the processing of the N-th band, the CPU can completely process the peripheral region of the red circle region 3601. Accordingly, the CPU can obtain a reliable determination result from the N-th band with respect to the red circle region 3603. From the foregoing, the characteristic amount determination for a red circle region positioned in the OverlapArea region should be performed in the band that can completely encompass a peripheral region of this red circle region.

Figures 37, 38:
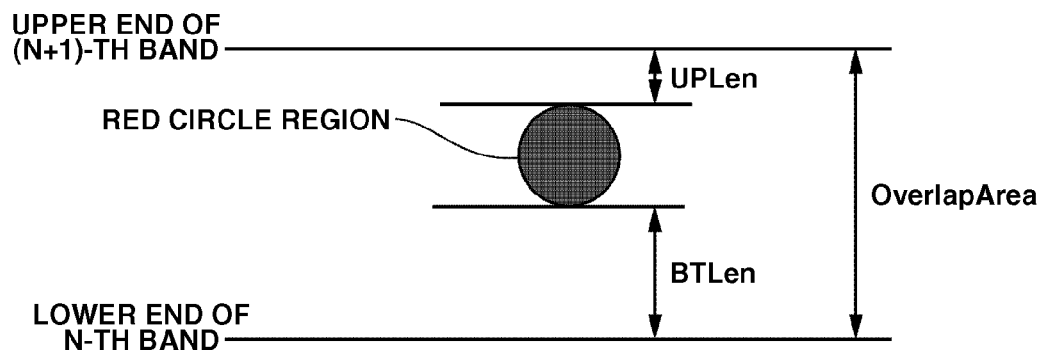
FIG. 37 illustrates an exemplary candidate region selection processing.
FIG. 38 illustrates an example of a candidate region list.

Accordingly, the candidate region selection processing (step S3403) performed in the fifth exemplary embodiment includes predicting a distance UPLen from the upper end of a red circle region to the upper end of the (N+1)th band and calculating a distance BTLen from the lower end of the red circle region to the lower end of the N-th band, when the red circle region is present in the OverlapArea region, as shown in FIG. 37.

Regarding the prediction of the distance UPLen, because the processing of the (N+1)th band is not finished, the CPU predicts the position of a red circle region in the (N+1)th band. When UPLen<BTLen, the CPU performs the characteristic amount determination for a target red circle region in the processing of the N-th band. When UPLen≧BTLen, the CPU performs the characteristic amount determination for a target red circle region in the processing of the (N+1)th band.

When the characteristic amount determination for a target red circle region is not performed in the processing of the N-th band, the CPU excludes the red circle region from the candidate region list of the N-th band. Similarly, the CPU calculates the distances UPLen and BTLen with respect to a red circle region 3604 shown in FIG. 36 and obtains a relationship of UPLen>BTLen. Thus, the CPU performs the characteristic amount determination for the red circle region 3604 in the processing of the (N+1)th band.

Furthermore, based on the similar determination, the CPU performs the characteristic amount determination for the red circle region 3601 in the processing of the (N−1)th band and performs the characteristic amount determination for the red circle region 3602 in the processing of the N-th band.

In this manner, according to the candidate region selection processing (step S3403 of FIG. 35), the CPU calculates the distances (margins) from the upper and lower ends of a target red circle region in the OverlapArea region to the upper and lower ends of the band, and determines a preferable band in which the characteristic amount determination for the target should be performed. Therefore, the CPU can avoid unnecessarily repeating the characteristic amount determination for a red circle region in the OverlapArea region.

Referring back to FIG. 35, in step S3404, the CPU applies the characteristic amount determination processing described in the above-described exemplary embodiment to the red circle region selected in the candidate region selection processing (step S3403). As a result, the CPU calculates correction parameters necessary for correcting the region identified as a red eye region (step S3405), and adds calculated parameters combined with the information of the red eye region to the candidate region list, as shown in FIG. 38 (step S3406)

The parameters to be added are a maximum luminance value Ymax and a maximum evaluation amount Ermax of a correction region required in the calculations of the correction amounts Vy and Vc (refer to formula (23)).

Referring back to FIG. 34, after accomplishing the extraction processing of a red eye region in the N-th band shown in FIG. 35 (step S3303), the CPU determines whether the processing of a final band is finished (step S3304). When the processing of all bands has been accomplished (i.e., YES in step S3304), the CPU terminates the processing. Otherwise, the CPU increments the counter N by 1 (step S3305) and the processing flow returns to step S3302.

Figure 39:
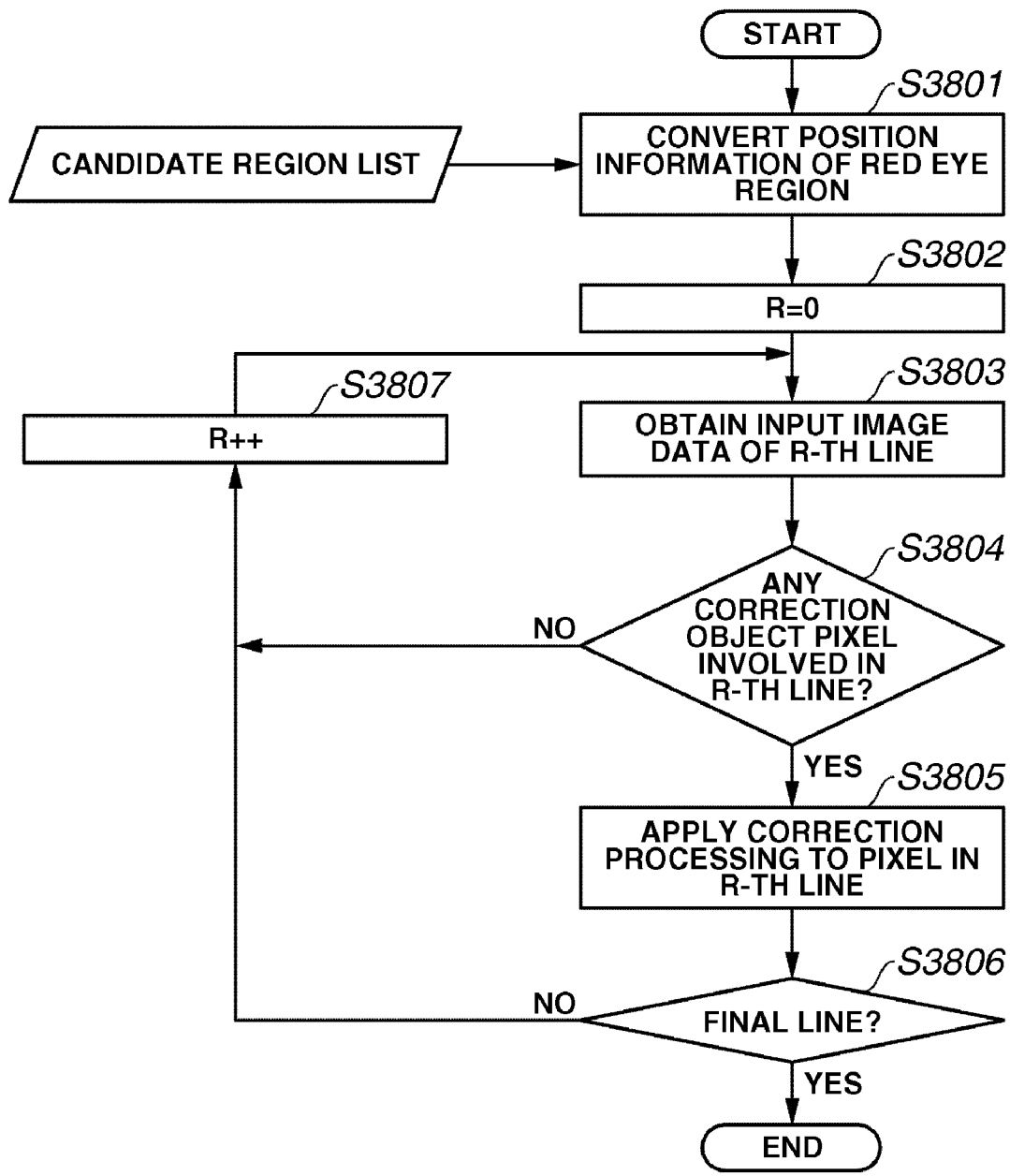
FIG. 39 is a flowchart illustrating exemplary correction processing in accordance with the fifth exemplary embodiment.

FIG. 39 is a flowchart illustrating exemplary correction processing in accordance with the fifth exemplary embodiment. First, the CPU converts position information of a red eye region (step S3801). In the fifth exemplary embodiment, the CPU performs the extraction processing of a red eye region on a reduced image, as described above, because the CPU executes the red eye region extraction and correction processing as built-in processing of an image input/output device.

However, a correction object image is a high resolution image which is not yet reduced. An image output device, such as a printer, may form an expanded image having a print (output) resolution prior to the reduction of the image, or may rotate the image. Accordingly, the CPU must convert the position information of a red eye region extracted from a reduced image with reference to a reduction rate or an expansion rate (i.e., variable magnification rate), or a rotational angle.

Figure 41:
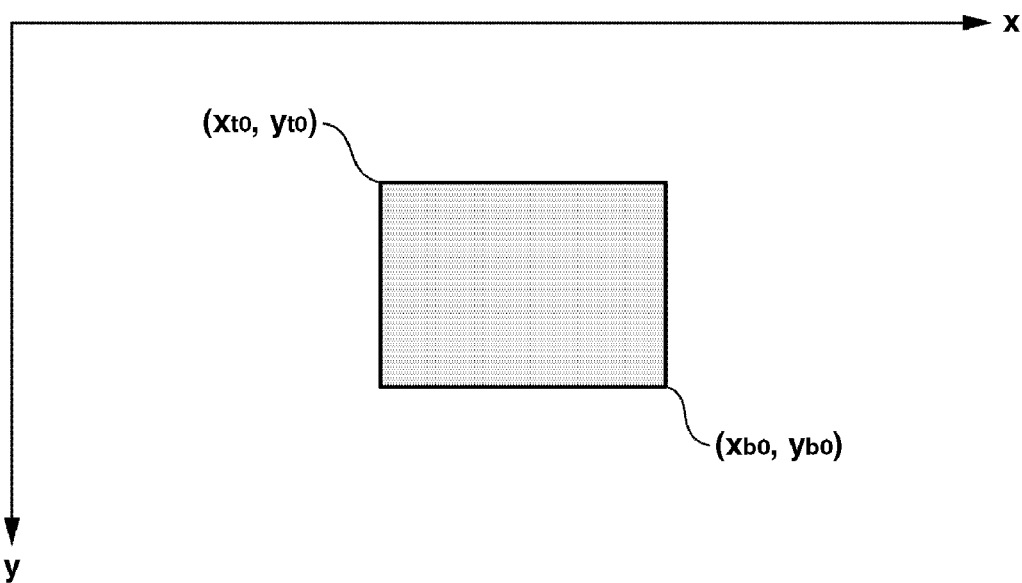
FIG. 41 illustrates exemplary position information of a red eye region stored in the candidate region list.

As shown in FIG. 41, the position information stored in the candidate region list includes upper left coordinates $(x_{t0}, y_{t0})$ and lower right coordinates $(x_{b0}, y_{b0})$ of a red eye region. When W0 and H0 represent pixel numbers in the horizontal and vertical directions of a reduced image, and W1 and H1 represent pixel numbers in the horizontal and vertical directions of a correction object image, the CPU calculates the coordinates of a red eye region on a correction object image according to the following formula (27).

$$(x_{t1}, y_{t1}) = \{\text{int}(x_{t0} \cdot k), \text{int}(y_{t0} \cdot k)\} \ (x_{b1}, y_{b1}) = \{\text{int}(x_{b0} \cdot k), \text{int}(y_{b0} \cdot k)\} \quad (27)$$

where, k=W1/W0, int( ) is a maximum integer not exceeding a value in parentheses, $(x_{t1}, y_{t1})$ represents the coordinates of an upper left corner of the red eye region on the correction object image, and $(x_{b1}, y_{b1})$ represents the coordinates of a lower right corner of the red eye region on the correction object image.

After accomplishing the processing of step S3801 (i.e., when the coordinates of a red eye region on the correction object image are determined), the CPU sets an elliptic region around the red-eye region as described in the first exemplary embodiment. Then, the CPU applies the following processing to a pixel included in the elliptic region (i.e., a correction object pixel).

First, the CPU initializes the counter R to 0 (step S3802), and obtains image data of an R-th line of the correction object image (step S3803). In the fifth exemplary embodiment, the CPU performs the correction processing in increments of one line on the correction object image. However, the CPU can perform the correction processing in increments of one band including a predetermined number of lines.

The CPU can obtain image data of the correction object image, for example, by expanding a predetermined line number of image data that is compressed according to a JPEG format and stored in the storage apparatus 105 shown in FIG. 1 or a memory card, and obtaining one or more lines of expanded image data.

Next, the CPU determines whether a correction object pixel is included in the image data of the R-th line (step S3804). In the correction processing according to the fifth exemplary embodiment, the CPU sets an elliptic region, as a correction object region, around a red eye region (i.e., a rectangular region). The CPU determines whether the R-th line is positioned between the upper end and the lower end of the correction object region, for all red eye regions stored in the candidate region list.

Figure 40:
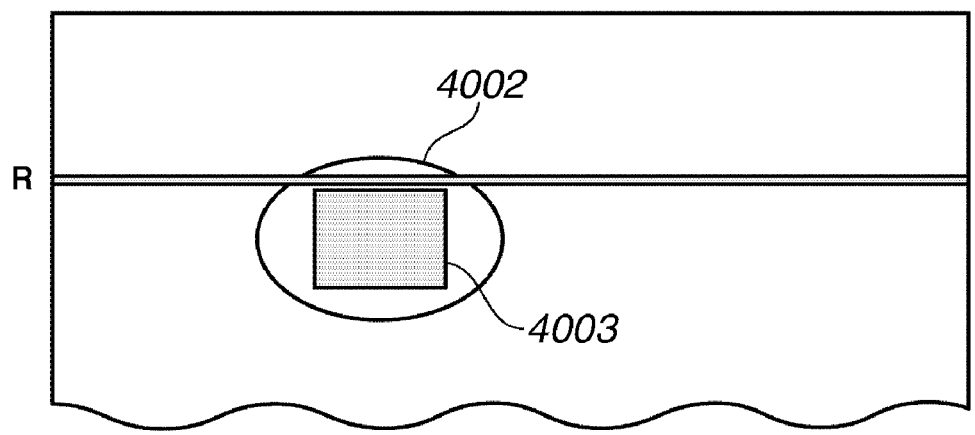
FIG. 40 illustrates an exemplary relationship between a correction line and a correction object region.

When the R-th line includes no correction object pixel, the CPU increments the counter R by 1 (step S3807) and the processing flow then returns to the step S3803. For example, according to an example shown in FIG. 40, the R-th line is included in a correction object region 4002 provided around a red eye region 4003.

Accordingly, the CPU applies the correction processing described in the first exemplary embodiment to the pixel included in the correction object region 4002 of the R-th line (step S3805). As shown in step S3405 (FIG. 35), the CPU has already obtained and stored, in the candidate region list, the maximum luminance value Ymax and the maximum evaluation amount Ermax. Thus, the CPU can use the stored values for the correction processing.

The CPU can apply the correction processing to the entire input image by repeating the above-described processing until the R-th line becomes the final line in the determination of step S3806. The corrected image data can be stored, for example, in the storage apparatus 105, or can be printed on a recording paper sheet by the printer 110 after accomplishing color conversion and pseudo-gradation processing.

In this manner, a reduced input image can be divided into plural bands. The red eye region extraction processing can be performed in increments of one band. Thus, even if a usable memory capacity is extremely small, the red eye region extraction and correction processing described in the first through fourth exemplary embodiments can be realized.

Furthermore, an overlap region is provided between neighboring bands when the image is divided, so that a red eye region existing on or near a band border can be surely extracted. A red eye region extracting section can be incorporated in an imaging apparatus or another image input device, and a red eye region correcting section can be incorporated in a printing apparatus or another image output device.

Modified Exemplary Embodiments

According to the above-described exemplary embodiments, the evaluation amount Er of each pixel is defined as an evaluation amount obtained from R and G component values without relying on a B component value. However, the evaluation amount Er of each pixel can be defined, for example, by the following formula (28). When a coefficient k is set to be 0 or less than coefficients i and j in the following formula (28), similar effects can be obtained. The coefficients i, j, and k are weighting values and can be negative values.

$$Er=(i \cdot R+j \cdot G+k \cdot B)/R \quad (28)$$

Furthermore, pixel values can be converted into another color space of Lab or YCbCr, and the evaluation amount Er can be defined without using a blue component, or with a small weighting of the blue component.

Other Exemplary Embodiments

The present invention can be applied to a system including plural devices (e.g. a host computer, an interface device, a reader, a printer, or other related or equivalent apparatus and/or methods as known by one of ordinary skill in the relevant art) or to a single apparatus (e.g., a copying machine, a facsimile apparatus, or other related or equivalent apparatus and/or methods as known by one of ordinary skill in the relevant art). Furthermore, to accomplish the present invention, program code (software) for realizing the functions of the above-described exemplary embodiments can be supplied, via a storage medium (or a recording medium), to a system or an apparatus. A computer (or CPU or micro-processing unit (MPU)) in the system or the apparatus can read the program code from the storage medium and can execute the readout program(s).

In this case, the program code read out from the storage medium can realize the functions of the exemplary embodiments. The equivalents of programs can be used if they possess comparable functions. Accordingly, when the functions or processes of the present invention are realized by a computer, program code installed in the computer and a recording medium storing the programs are also used for realizing the present invention.

In other words, the present invention encompasses the computer programs that can realize the functions or processes of the present invention or any recording medium that can store the program(s). In this case, the type of program(s) can be selected from any one of object code, interpreter programs, and operating system (OS) script data. A recording medium supplying the program(s) can be, for example, a flexible disk, a hard disk, an optical disk, a magneto-optical disk (MO), a compact disk-ROM (CD-ROM), a CD-recordable (CD-R), a CD-rewritable (CD-RW), a magnetic tape, a nonvolatile memory card, a ROM, or a digital versatile disk (DVD) (e.g., DVD-ROM, DVD-R).

The method for supplying the program(s) includes accessing a home page on the Internet using the browsing function of a client computer, when the home page allows each user to download the computer programs, or compressed files of the programs having automatic installing functions, to a hard disk or another recording medium of the user.

Furthermore, the program code can be divided into a plurality of files so that respective files are downloadable from different home pages. WWW servers that allow numerous users to download the program files so that the functions or processes of the present invention can be realized on their computers can be used.

Furthermore, enciphering the programs and storing the enciphered programs on a CD-ROM or comparable recording medium is an exemplary method for distributing the programs to users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an OS running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-174252 filed Jun. 14, 2005, which is hereby incorporated by reference herein in its entirety.

What is claimed is:

1. An image processing apparatus configured to detect an image region indicating a poor color tone of eyes, the image processing apparatus comprising:

a calculation unit configured to calculate an evaluation amount with respect to the poor color tone for each pixel of an input image based on a predetermined color component;

a pixel extraction unit configured to extract candidate pixels constituting an image region indicating the poor color tone based on the evaluation amount;

a region extraction unit configured to extract a candidate region of a predetermined shape that includes the candidate pixels;

a first determination unit configured to perform a determination relating to a characteristic amount of a peripheral region of the candidate region;

an updating unit configured to update the candidate region based on a determination result obtained by the first determination unit;

a second determination unit configured to perform a determination relating to an edge intensity of a peripheral region of the updated candidate region; and a detection unit configured to detect the image region indicating the poor color tone, based on a determination result obtained by the second determination unit.

2. The image processing apparatus according to claim 1, wherein the evaluation amount is a ratio (R−G)/R obtained from a pixel having a red component larger than a green component, where R represents the red component and G represents the green component.

3. The image processing apparatus according to claim 1, wherein the calculation unit is configured to calculate the evaluation amount based on red and green components of the input image.

4. The image processing apparatus according to claim 1, wherein a weighting applied to a blue component of the input image is smaller than those applied to red and green components, and the calculation unit is configured to calculate the evaluation amount based on the red, green and blue components of the input image.

5. The image processing apparatus according to claim 1, wherein the characteristic amount of the peripheral region is one of luminance, hue, and saturation.

6. The image processing apparatus according to claim 1, where the second determination unit is configured to perform determination including setting a peripheral region around the updated candidate region, calculating an edge intensity for each pixel in the peripheral region, calculating an average value of edge intensities, and determining that the candidate region is not a correction region if the average value is less than a predetermined value.

7. The image processing apparatus according to claim 6, wherein the second determination unit is further configured to perform determination including calculating a difference between a maximum value and a minimum value of the edge intensities, and determining that the candidate region is not the correction region if the difference is less than a predetermined value.

8. The image processing apparatus according to claim 7, wherein the second determination unit is further configured to perform determination including calculating a centroid position of the edge intensities, and determining that the candidate region is not the correction region if the centroid position is not present in the vicinity of the center of the peripheral region.

9. The image processing apparatus according to claim 8, wherein the second determination unit is further configured to perform determination including dividing the peripheral region into a central region and an external region, calculating an average value of edge intensities in each of the central region and the external region, and determining that the candidate region is not the correction region if a ratio of the average value in the central region to the average value in the external region is less than a predetermined value.

10. The image processing apparatus according to claim 9, wherein the second determination unit is further configured to perform determination including determining that the candidate region is not the correction region if the average value in the central region is less than a predetermined value.

11. The image processing apparatus according to claim 10, wherein the second determination unit is further configured to perform determination including determining that the candidate region is not the correction region if the average value in the external region is greater than a predetermined value.

12. An image processing apparatus configured to detect an image region indicating a poor color tone of eyes, the image processing apparatus comprising:

a calculation unit configured to calculate an evaluation amount with respect to the poor color tone for each pixel of an input image based on a predetermined color component;

a pixel extraction unit configured to extract candidate pixels constituting an image region indicating the poor color tone based on the evaluation amount;

a region extraction unit configured to extract a candidate region of a predetermined shape that includes the candidate pixels;

a region determination unit configured to perform a first determination relating to the evaluation amount in the candidate region and the evaluation amount in a peripheral region of the candidate region, a second determination relating to the evaluation amount of a predetermined hue of pixels in the candidate region and a predetermined color component, a third determination relating to luminance in the peripheral region, a fourth determination relating to one of hue and saturation in the peripheral region, and a fifth determination relating to edge intensity in the peripheral region; and a designation unit configured to designate, as a correction region, the candidate region satisfying at least one of the first through fifth determinations performed by the region determination unit.

13. The image processing apparatus according to claim 12, wherein the evaluation amount is a ratio (R−G)/R obtained from a pixel having a red component larger than a green component, where R represents the red component and G represents the green component.

14. The image processing apparatus according to claim 12, wherein the calculation unit is configured to calculate the evaluation amount based on red and green components of the input image.

15. The image processing apparatus according to claim 12, wherein a weighting applied to a blue component of the input image is smaller than those applied to red and green components, and the calculation unit is configured to calculate the evaluation amount based on the red, green and blue components of the input image.

16. The image processing apparatus according to claim 12, wherein the pixel extraction unit is configured to extract the candidate pixels by setting a predetermined window region near a target pixel, determining a threshold based on the evaluation amount of pixels included in the window region, and binarizing the evaluation amount of the target pixel with reference to the threshold.

17. The image processing apparatus according to claim 16, wherein the pixel extraction unit is configured to set the window region corresponding to a plurality of pixels along a line extending from the target pixel.

18. The image processing apparatus according to claim 16, wherein the pixel extraction unit is configured to extract a candidate pixel by scanning the target pixel in a line direction and then extract a candidate pixel by scanning the target pixel in an opposed direction, and determine the pixel extracted in both scanning operations as the candidate pixel.

19. The image processing apparatus according to claim 12, wherein the region extraction unit is configured to extract, as the candidate region, a circular or elliptic region constructed by candidate pixels.

20. The image processing apparatus according to claim 12, wherein the region determination unit is configured to execute the first through fifth determinations in sequential order from the first determination through the fifth determination.

21. The image processing apparatus according to claim 12, wherein the first determination includes setting the peripheral region around the candidate region, obtaining a first average value of the evaluation amount in the candidate region, obtaining a second average value of the evaluation amount in each of a plurality of blocks constituting the peripheral region, and determining that the candidate region is not the correction region if the first average value is less than a predetermined multiple of the second average value in any one of the blocks.

22. The image processing apparatus according to claim 12, wherein the second determination includes calculating, in the candidate region, an average value of evaluation amounts of pixels having a predetermined range of hue, and determining that the candidate region is not the correction region if the average value is out of a predetermined range.

23. The image processing apparatus according to claim 22, wherein the second determination further includes obtaining, in the candidate region, a maximum value and a minimum value of the evaluation amounts of the pixels having the predetermined range of hue, and determining that candidate region is not the correction region if a ratio of the minimum value to the maximum value is greater than a predetermined threshold.

24. The image processing apparatus according to claim 23, wherein the second determination further includes calculating a variance or standard deviation of a predetermined color component of pixels in the candidate region, and determining that the candidate region is not the correction region if the variance or standard deviation is less than a predetermined threshold.

25. The image processing apparatus according to claim 23, wherein the second determination further includes calculating an average value of absolute differential values between the pixels of the predetermined color component in the candidate region and neighboring pixels, and determining that the candidate region is not the correction region if the average value is less than a predetermined threshold.

26. The image processing apparatus according to claim 12, wherein the third determination includes setting a peripheral region around the candidate region, calculating an average luminance value in the peripheral region, and determining that the candidate region is not the correction region if the average luminance value is out of a predetermined range.

27. The image processing apparatus according to claim 26, wherein the third determination further includes setting a peripheral region to have a size equivalent to a predetermined multiple of a size of the candidate region, dividing the peripheral region into a plurality of blocks, calculating an average luminance value for each block, calculate a maximum value and a minimum value of the average luminance values, and determining that the candidate region is not the correction region if a difference between the maximum value and the minimum value is less than a predetermined value.

28. The image processing apparatus according to claim 12, wherein the fourth determination includes setting a peripheral region around the candidate region, calculating a rate of pixels having a predetermined range of hue in the peripheral region, and determining that the candidate region is not the correction region if the rate is less than a predetermined value.

29. The image processing apparatus according to claim 28, wherein the fourth determination further includes calculating an average saturation in the peripheral region, and determining that the candidate region is not the correction region if the average saturation is not included in a predetermined range.

30. The image processing apparatus according to claim 29, wherein the fourth determination further includes detecting, in the peripheral region, pixels having a value less than a predetermined value in the division of saturation by luminosity, and determining that the candidate region is not the correction region if no such pixels are detected.

31. The image processing apparatus according to claim 12, wherein the fifth determination includes setting a peripheral region around the candidate region, calculating an edge intensity for each pixel in the peripheral region, calculating an average value of the edge intensities, and determining that the candidate region is not the correction region if the average value is less than a predetermined value.

32. The image processing apparatus according to claim 31, wherein the fifth determination further includes calculating a difference between a maximum value and a minimum value of the edge intensities, and determining that the candidate region is not the correction region if the difference is less than a predetermined value.

33. The image processing apparatus according to claim 32, wherein the fifth determination further includes calculating a centroid position of the edge intensities, and determining that the candidate region is not the correction region if the centroid position is not present in the vicinity of the center of the peripheral region.

34. The image processing apparatus according to claim 33, wherein the fifth determination further includes dividing the peripheral region into a central region and an external region, calculating an average value of the edge intensities in each of the central region and the external region, and determining that the candidate region is not the correction region if a ratio of the average value in the central region to the average value in the external region is less than a predetermined value.

35. The image processing apparatus according to claim 34, wherein the fifth determination further includes determining that the candidate region is not the correction region if the average value in the central region is less than a predetermined value.

36. The image processing apparatus according to claim 35, wherein the fifth determination further includes determining that the candidate region is not the correction region if the average value in the external region is greater than a predetermined value.

37. An image processing method for detecting an image region indicating a poor color tone of eyes, the image processing method comprising:
   calculating an evaluation amount with respect to the poor color tone for each pixel of an input image based on a predetermined color component;
   extracting candidate pixels constituting an image region indicating the poor color tone based on the evaluation amount;
   extracting a candidate region of a predetermined shape that includes the candidate pixels;
   performing a determination relating to a characteristic amount of a peripheral region of the candidate region;
   updating the candidate region based on a determination result obtained by performing the determination relating to the characteristic amount of the peripheral region of the candidate region;

performing a determination relating to an edge intensity of a peripheral region of the updated candidate region; and detecting the image region indicating the poor color tone based on a determination result obtained by performing the determination relating to the edge intensity of the peripheral region of the updated candidate region.

38. A program for controlling an image processing apparatus to execute the image processing method according to claim 37.

39. A storage medium storing the program according to claim 38.

40. An image processing method for detecting an image region indicating a poor color tone of eyes, the image processing method comprising:
- calculating an evaluation amount with respect to the poor color tone for each pixel of an input image based on a predetermined color component;
- extracting candidate pixels constituting an image region indicating the poor color tone based on the evaluation amount;
- extracting a candidate region of a predetermined shape that includes the candidate pixels;
- performing a first determination relating to the evaluation amount in the candidate region and the evaluation amount in a peripheral region of the candidate region, a second determination relating to one of the evaluation amount of a predetermined hue of pixels in the candidate region and a predetermined color component, a third determination relating to luminance in the peripheral region, a fourth determination relating to one of hue and saturation in the peripheral region, and a fifth determination relating to edge intensity in the peripheral region; and
- designating, as a correction region, the candidate region satisfying at least one of the first through fifth determinations performed.

41. An image processing apparatus configured to detect an image region indicating a poor color tone of eyes from candidate regions indicating a poor color tone of eyes, the image processing apparatus comprising:
- a first determination unit configured to perform a determination relating to an evaluation amount with respect to the poor color tone based on a predetermined color component in a target candidate region, and the evaluation amount in a peripheral region of the candidate region;
- a second determination unit configured to update the candidate region based on a determination result obtained by the first determination unit and perform a determination relating to one of the evaluation amount and a predetermined color component with reference to pixels in an updated second candidate region; and
- a third determination unit configured to update the second candidate region based on a determination result obtained by the second determination unit and perform a determination relating to a characteristic amount of a peripheral region with reference to pixels in a peripheral region of an updated third candidate region,
wherein a calculation amount of the determination performed by the third determination unit is greater than a calculation amount of the determination performed by one of the first determination unit and the second determination unit.

42. The image processing apparatus according to claim 41, wherein the characteristic amount of the peripheral region is one of luminance, hue, saturation, and edge intensity.

43. An image processing method for detecting an image region indicating a poor color tone of eyes from candidate regions indicating a poor color tone of eyes, the image processing method comprising:
- performing a first determination relating to an evaluation amount with respect to the poor color tone based on a predetermined color component in a target candidate region, and the evaluation amount in a peripheral region of the candidate region;
- updating the candidate region based on a determination result obtained by the first determination;
- performing a second determination relating to one of the evaluation amount and a predetermined color component with reference to pixels in an updated second candidate region;
- updating the second candidate region based on a determination result obtained by the second determination; and
- performing a third determination relating to a characteristic amount of a peripheral region with reference to pixels in a peripheral region of an updated third candidate region,
wherein a calculation amount of the third determination is greater than a calculation amount of the first determination and the second determination.

44. The image processing method according to claim 43, wherein characteristic amount of the peripheral region is one of luminance, hue, saturation, and edge intensity.

* * * * *